US012411639B2

(12) United States Patent
Morita

(10) Patent No.: US 12,411,639 B2
(45) Date of Patent: Sep. 9, 2025

(54) DISPLAYING LIST OF FILES INCLUDING FILE UPLOADED VIA CHAT SCREEN IN AN INFORMATION PROCESSING SYSTEM

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 25 days.

(21) Appl. No.: 18/525,323

(22) Filed: Nov. 30, 2023

(65) Prior Publication Data
US 2024/0184489 A1   Jun. 6, 2024

(30) Foreign Application Priority Data

Dec. 2, 2022   (JP) .................. 2022-193467

(51) Int. Cl.
*G06F 3/12*    (2006.01)
*H04N 1/21*    (2006.01)

(52) U.S. Cl.
CPC .......... *G06F 3/1203* (2013.01); *G06F 3/1237* (2013.01); *H04N 1/2179* (2013.01); *G06F 3/1285* (2013.01); *G06F 3/1292* (2013.01); *H04N 2201/0012* (2013.01)

(58) Field of Classification Search
CPC .... G06F 3/1203; G06F 3/1237; G06F 3/1285; G06F 3/1292; H04N 1/2179; H04N 2201/0012
See application file for complete search history.

(56) References Cited

U.S. PATENT DOCUMENTS

| | | | |
|---|---|---|---|
| 11,252,283 B2* | 2/2022 | Hiramatsu | G06F 3/127 |
| 11,586,405 B2* | 2/2023 | Nakamori | G06F 3/1204 |
| 11,736,650 B2* | 8/2023 | Ito | H04L 51/046 |
| | | | 358/1.15 |
| 11,842,092 B2* | 12/2023 | Ushinohama | G06F 3/1207 |
| 12,177,391 B2* | 12/2024 | Morita | H04N 1/00233 |
| 2017/0208181 A1* | 7/2017 | Kim | H04N 1/0023 |
| 2023/0283723 A1* | 9/2023 | Matsuoka | H04N 1/00437 |
| | | | 358/1.15 |

FOREIGN PATENT DOCUMENTS

JP    2022036753 A    3/2022

* cited by examiner

*Primary Examiner* — Scott A Rogers
(74) *Attorney, Agent, or Firm* — Canon U.S.A., Inc., IP Division

(57) ABSTRACT

An information processing system includes a management unit configured to manage files which are accessible to a user of at least one information processing apparatus from among a plurality of information processing apparatuses that communicate with each other via a network that enable users to perform communication, a display unit configured to display, on a screen, a list of files including a file included in the files managed by the management unit and identified based on access time of the file, and an output unit configured to output information for printing a file selected by a user from among the list of files displayed by the display unit.

12 Claims, 17 Drawing Sheets

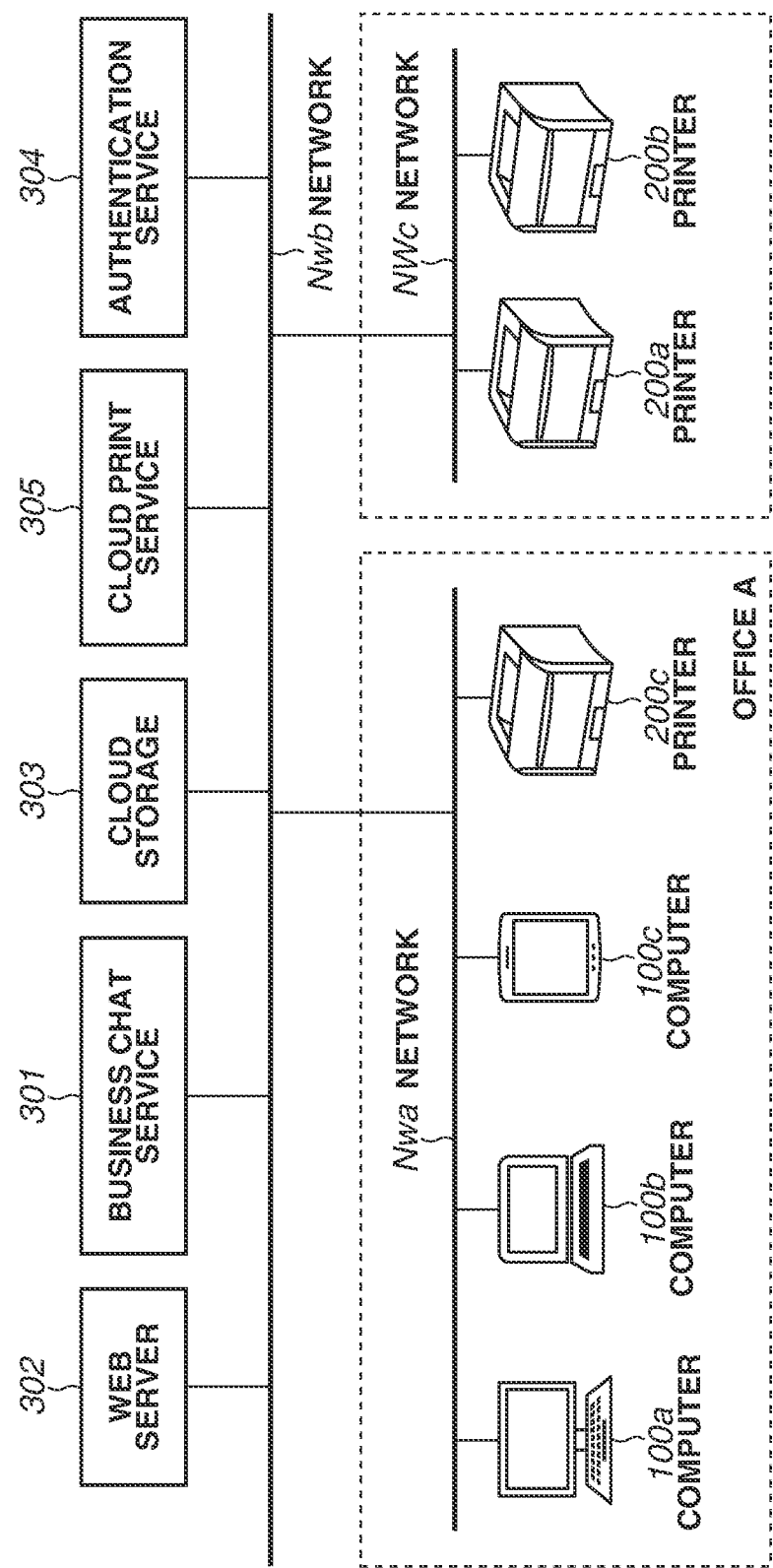

FIG.5

| | Type | Name | Modified | Location |
|---|---|---|---|---|
| ☐ | | Test.pptx | Just Now | proj / General |
| ☑ | | Sample.pptx | 10m ago | user's OneDrive |
| ☐ | | domodoc.pdf | yesterday | proj / Share Do... |
| ☐ | | Presentation.pptx | 3/25/2022 | user's OneDrive |
| ☐ | | specification.pdf | 7/14/2022 | proj / Share Do... |
| ☐ | | salesresults.xlsx | 7/3/2022 | proj / Share Do... |
| ☐ | | manual.pdf | 5/22/2022 | proj / General |
| ☐ | | Readme_JP.pdf | 5/21/2022 | proj / Share Do... |
| ☐ | | Readme_EN.pdf | 5/21/2022 | proj / Share Do... |
| ☐ | | list.xlsx | 4/19/2022 | proj / General |

FIG.6A

| User ID | Domain for Participation | Channel ID | Group ID | Application |
|---|---|---|---|---|
| User A | xxx.co.jp | team 1 | group 1, group 2 | Printing Application |
| User B | yyy.com | team X | group A | ToDo List Application, Printing Application |

FIG.6B

| Group ID | Chat Information ID | File Information | Meeting ID |
|---|---|---|---|
| group 1 | Chat xxx | File A | meeting 1 |

FIG.6C

| User ID / Group ID | Application ID | Application | Version Information | Summary |
|---|---|---|---|---|
| User A | Printing Application | Printing Application | Ver. 1.0 | Application for Supporting File Printing |
| group A | ToDo List Application | ToDo List Application | Ver. 1.1 | Application for Creation and Displaying of ToDo List |

FIG.6D

| File Name | File Path | User ID / Channel ID / Group ID for Which Access is Permitted | Recent Access Date and Time | Creator of File | Reference Information |
|---|---|---|---|---|---|
| AAA.pdf | file://yyy.zz.file A | group 1 | 2022/9/30 | User A | http://xxx.co.jp, http://yyy.co.jp |

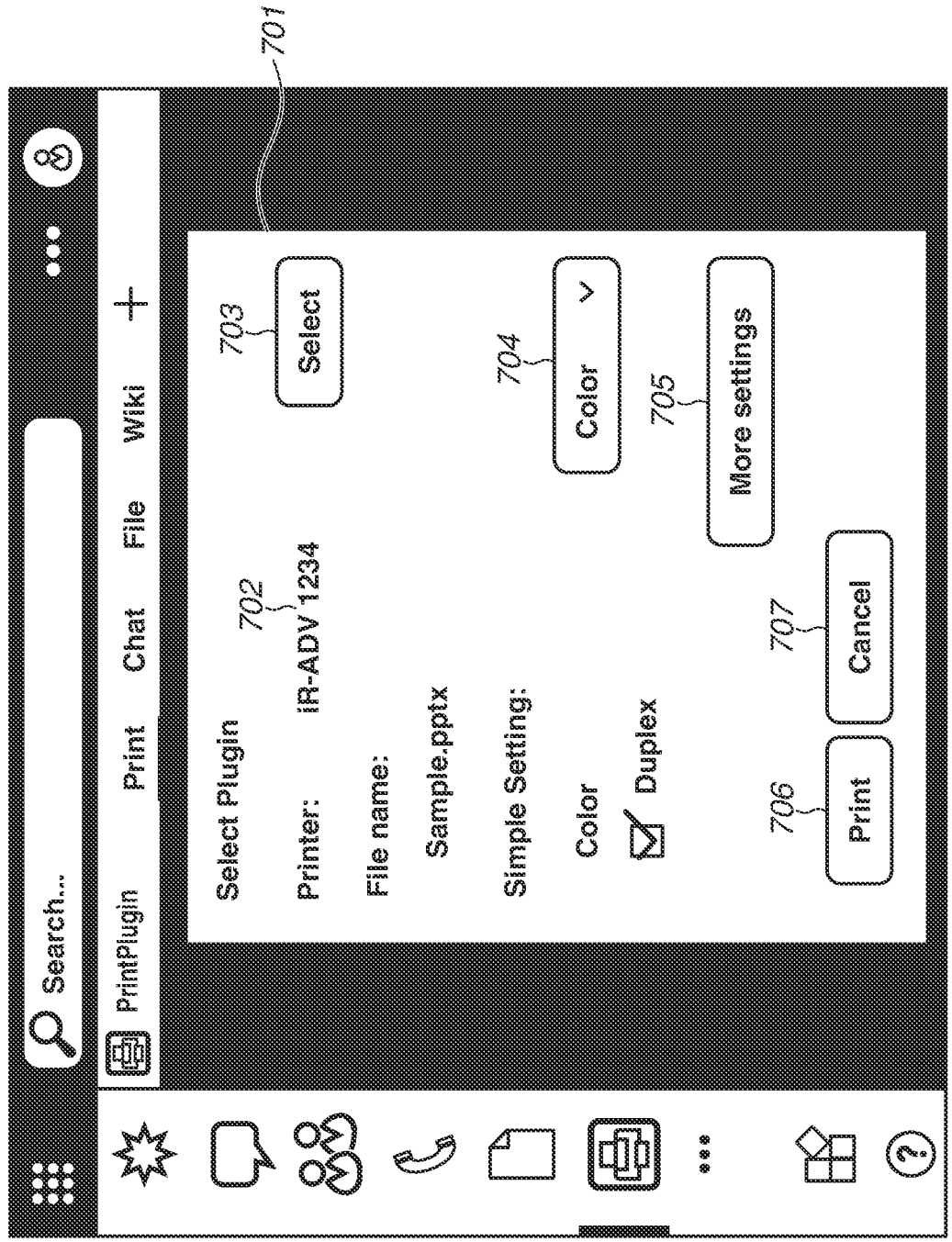

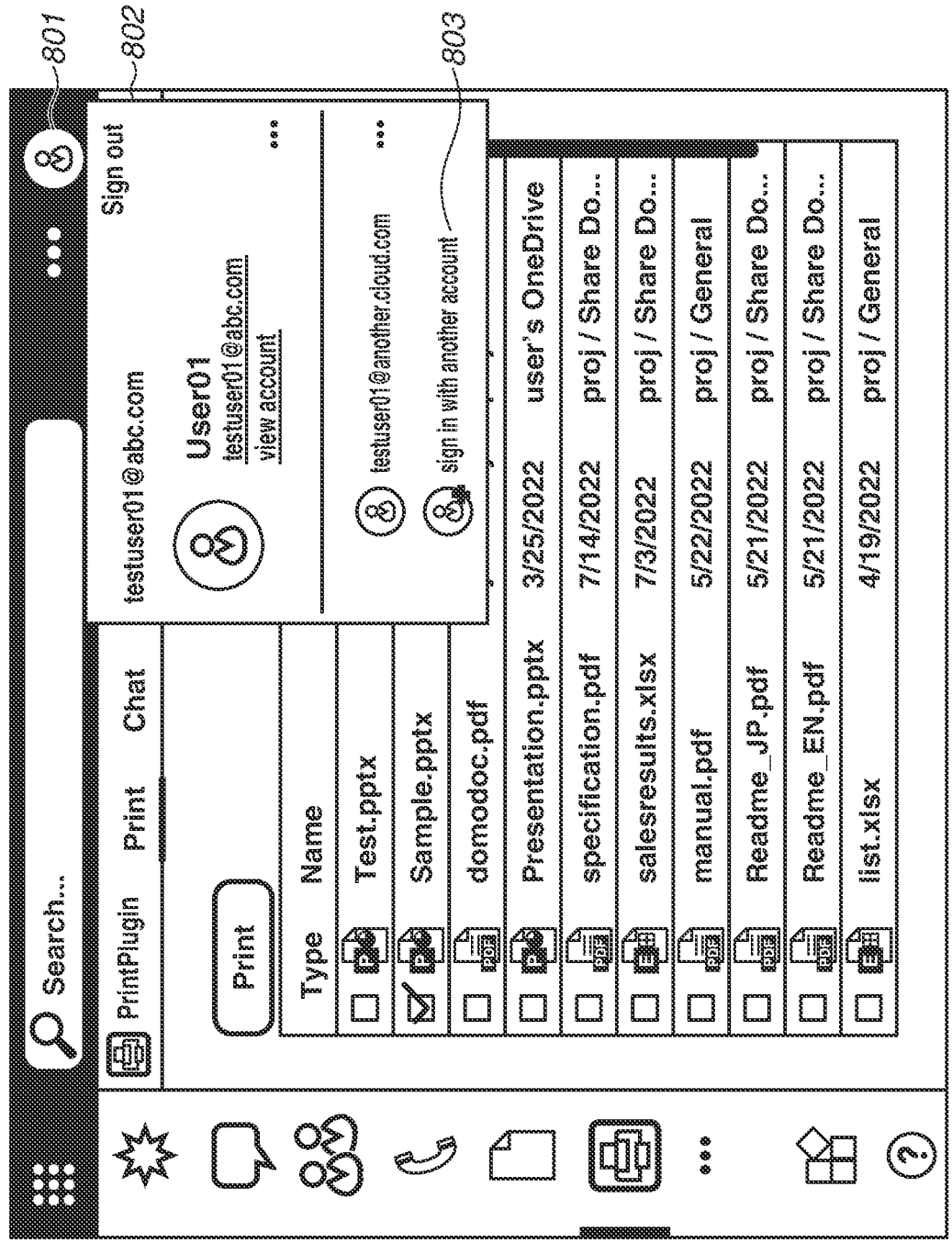

FIG.12

| Print Service | Default Printer |
|---|---|
| cloud_printA.com | LPR1111 |
| printB.net | XK90 Series |
| print_service.co.jp | iR2222 |
| ⋮ | ⋮ |
| Local Default | iR ADV 1234 |

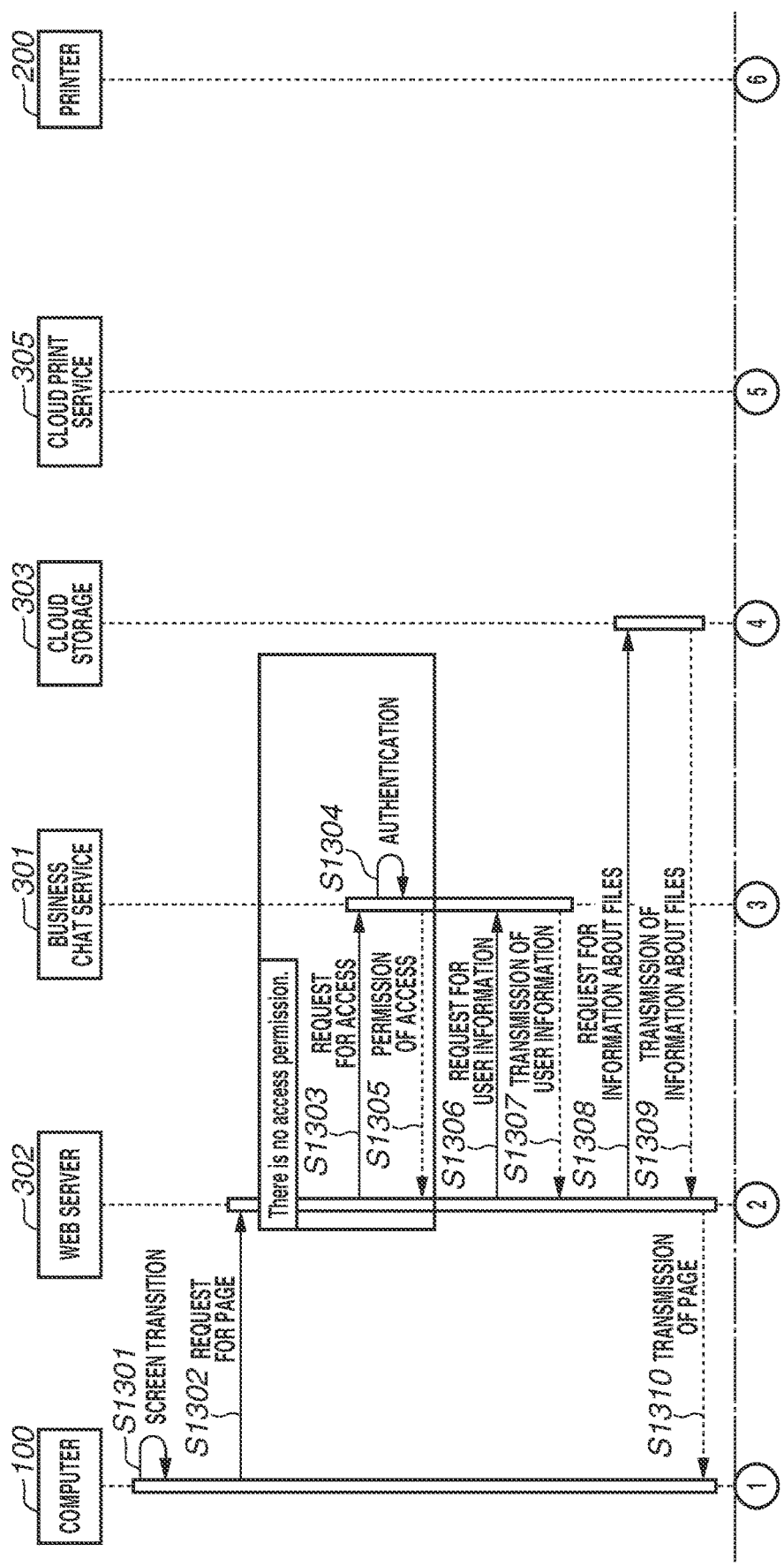

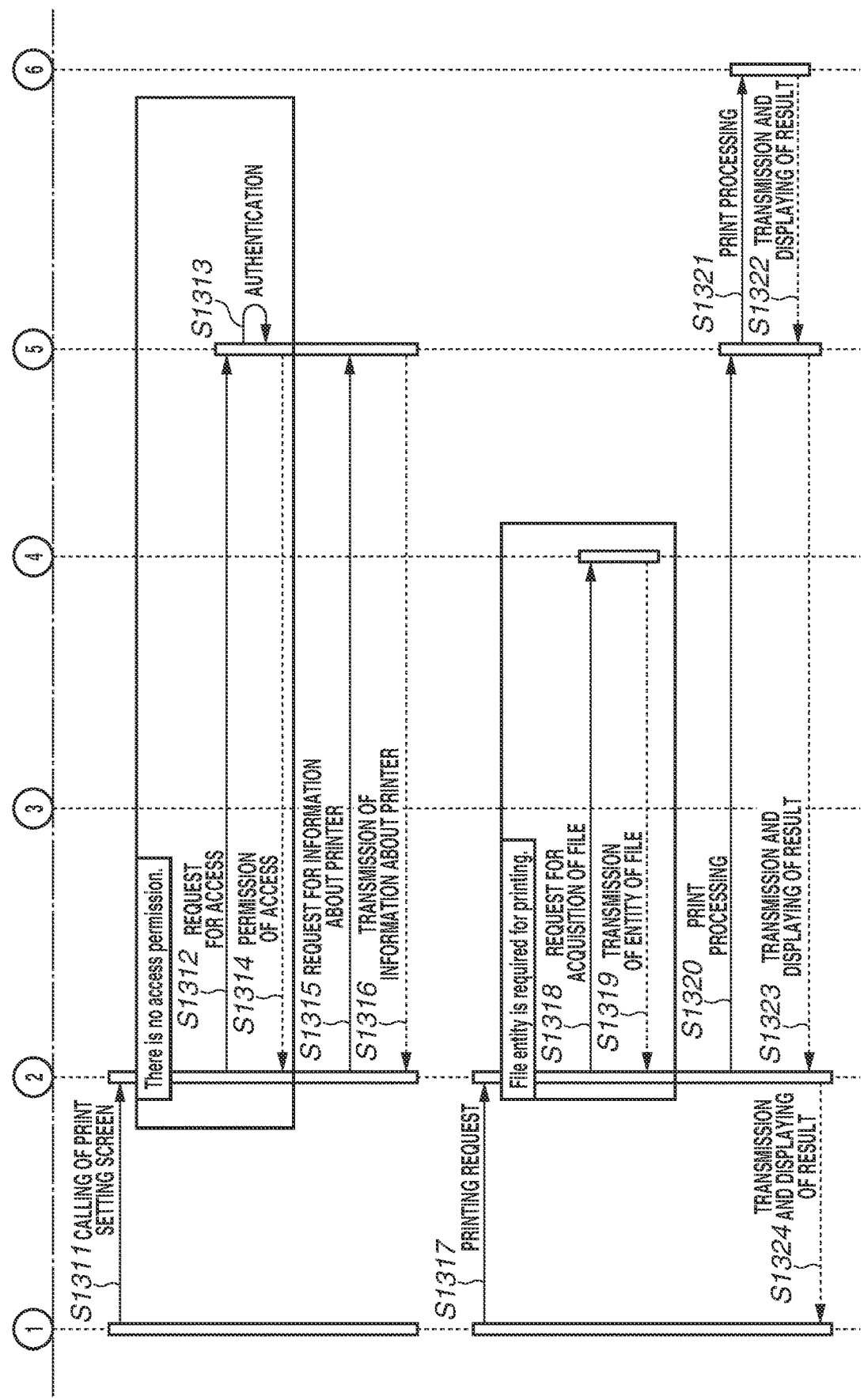

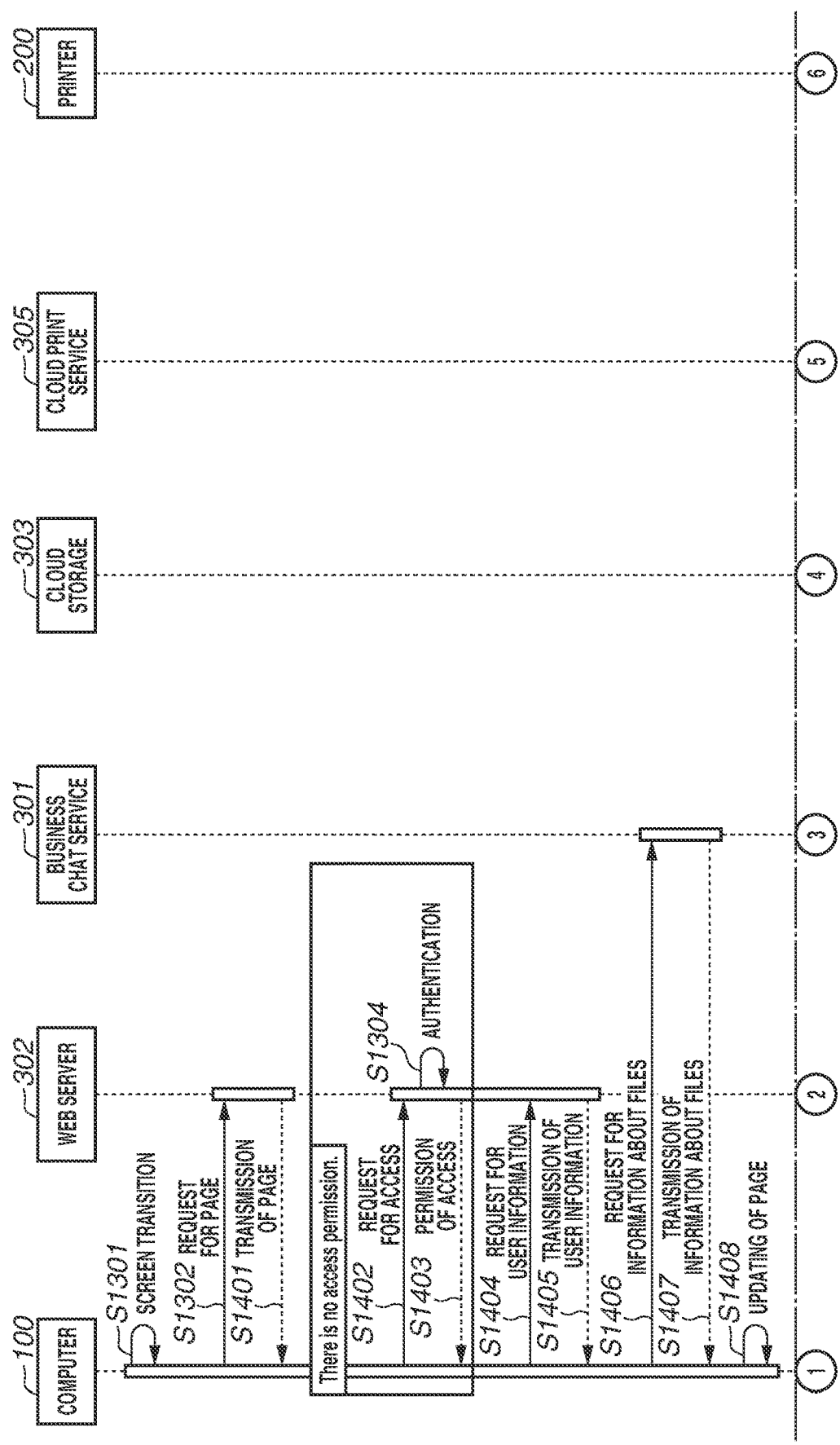

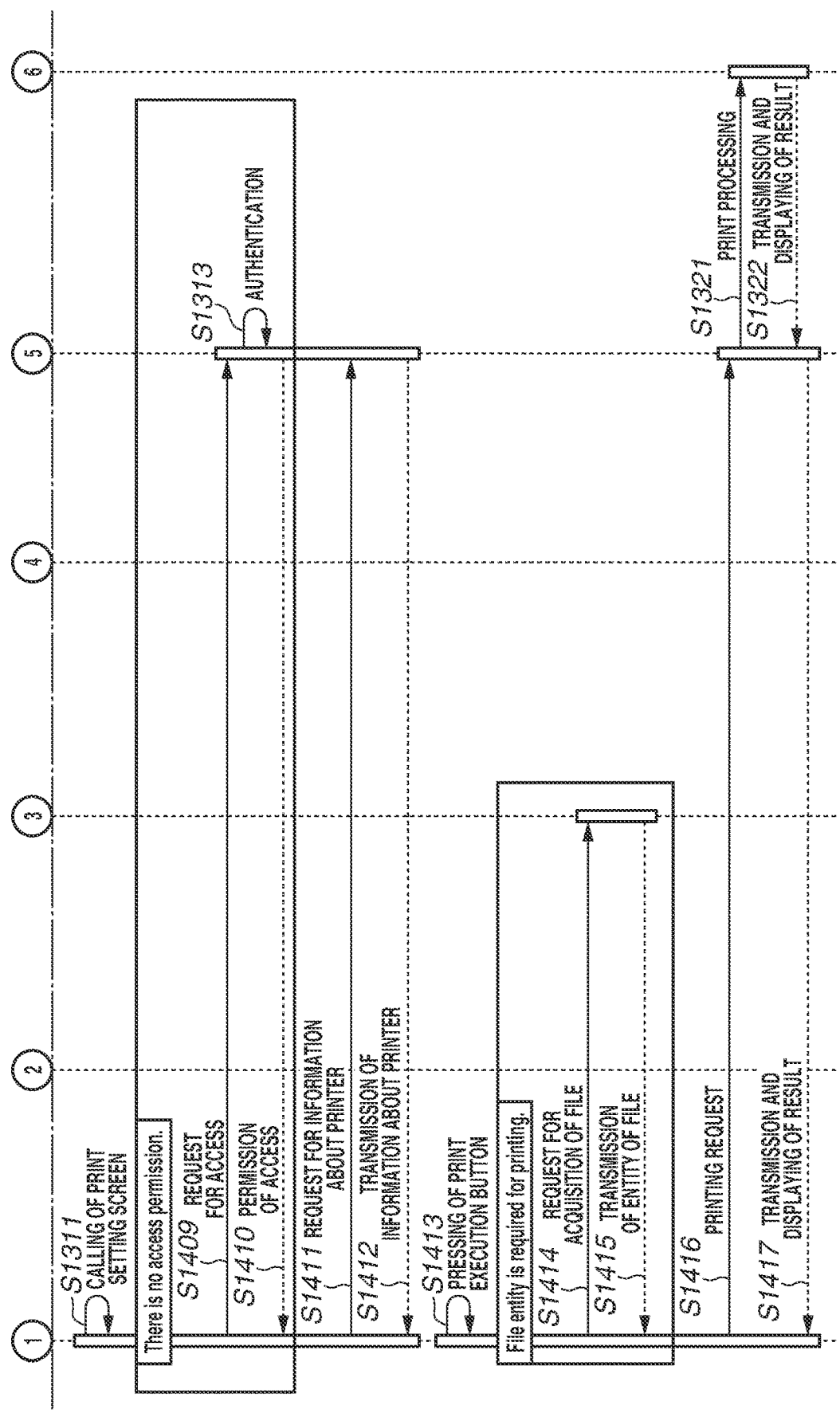

DISPLAYING LIST OF FILES INCLUDING FILE UPLOADED VIA CHAT SCREEN IN AN INFORMATION PROCESSING SYSTEM

BACKGROUND

Technical Field

Aspects of the present disclosure generally relate to an information processing system, an image processing method, and a storage medium.

Description of the Related Art

Recently, situations in which business chat or web conferencing is used for work or task have been increasing. Along with this increase, situations in which information is shared with another user by, for example, transmitting a message with a file attached thereto or uploading a file to be used in web conferencing to a cloud storage have been increasing.

Japanese Patent Application Laid-Open No. 2022-36753 discusses a method which enables, with regarding a file to which a plurality of users is able to refer via a service which provides a business chat function or a web conferencing function, issuing an instruction for printing via a screen which the service provides.

For example, to print a file uploaded with use of the chat function, it becomes for the user to review a chat screen and search for a message with a file attached thereto. Accordingly, there is an issue in which, for example, in a case where files are shared by a plurality of users with use of a communication tool such as a chat function or web conferencing function, the user takes a lot of trouble to select a file targeted for printing.

SUMMARY

According to an aspect of the present disclosure, an information processing system includes a management unit configured to manage files which are accessible to a user of at least one information processing apparatus from among a plurality of information processing apparatuses that communicate with each other via a network that enable users to perform communication, a display unit configured to display, on a screen, a list of files including a file included in the files managed by the management unit and identified based on access time of the file, and an output unit configured to output information for printing a file selected by a user from among the list of files displayed by the display unit.

Further features of the present disclosure will become apparent from the following description of exemplary embodiments with reference to the attached drawings.

BRIEF DESCRIPTION OF THE DRAWINGS

FIG. 1 is a diagram illustrating a configuration of an information processing system.

FIG. 5 is a diagram illustrating a second display form of the business chat service screen.

FIGS. 6A, 6B, 6C, and 6D are diagrams illustrating respective pieces of information which are managed in the information processing system.

FIG. 7 is a diagram illustrating a print setting screen.

FIG. 8 is a diagram illustrating a login screen to a business chat service.

FIG. 12 is a diagram illustrating information about default printers.

FIGS. 13A and 13B are sequence diagrams illustrating a first example of the overall processing which is performed by the information processing system.

FIGS. 14A and 14B are sequence diagrams illustrating a second example of the overall processing which is performed by the information processing system.

DESCRIPTION OF THE EMBODIMENTS

Figure 2A:
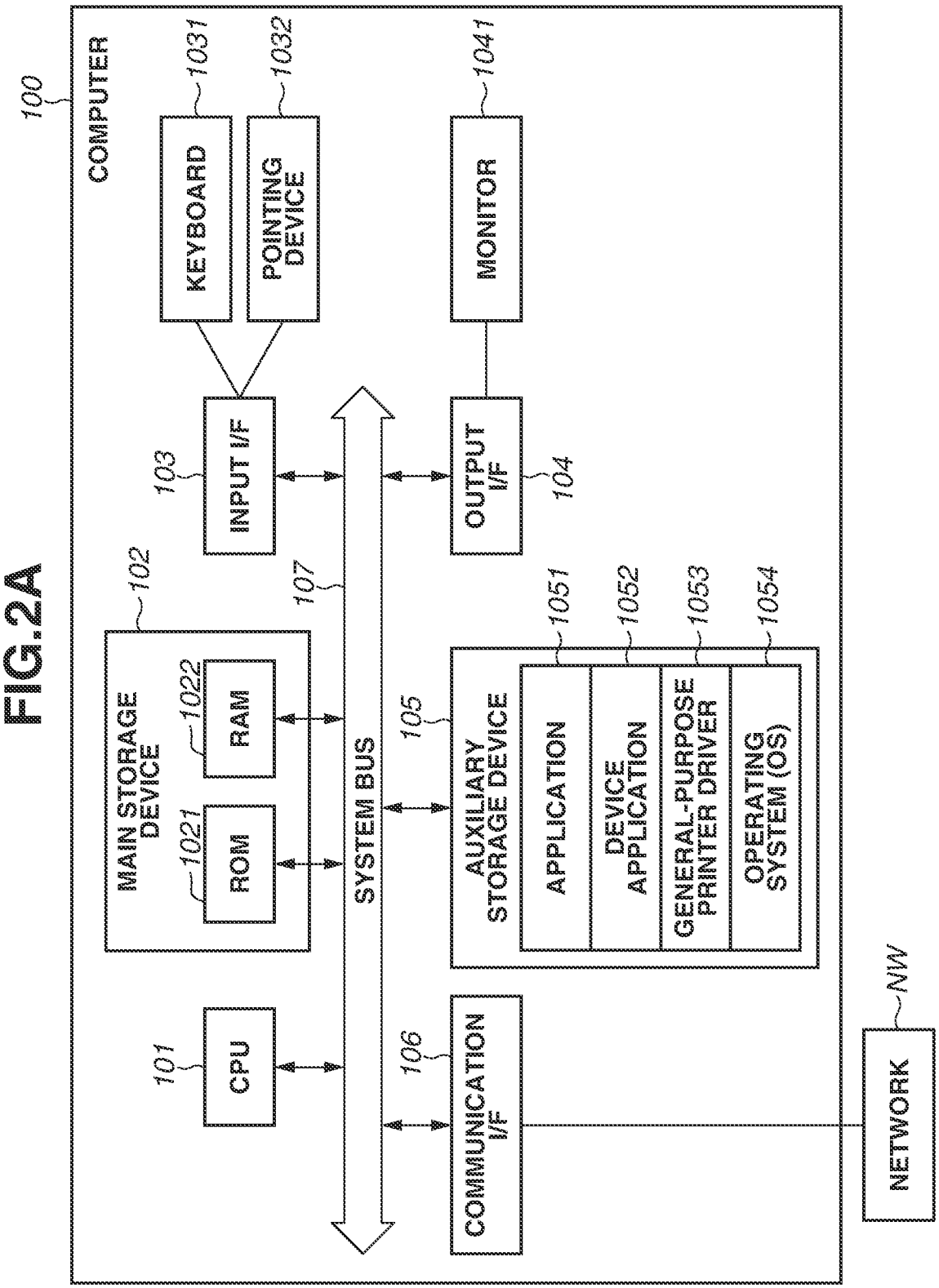
FIG. 2A is a diagram illustrating a hardware configuration of a computer.

Various exemplary embodiments, features, and aspects of the disclosure will be described in detail below with reference to the drawings.

First, a first exemplary embodiment is described.

FIG. 1 is a diagram illustrating an example of an information processing system. In FIG. 1, the information processing system includes computers 100a to 100c and printers 200a to 200c. Moreover, in FIG. 1, the information processing system further includes a business chat service 301, a web server 302, a cloud storage 303, an authentication service 304, a cloud print service 305, and networks NWa to NWc.

In FIG. 1, a case where the computers 100a to 100c, each of which creates a document or an image to be printed, and the printer 200c are connected to the network NWa in an office A is illustrated as an example.

Furthermore, the computers 100a to 100c and the printer 200C can be interconnected via a plurality of networks in such a way as to be able to mutually communicate with each other. Moreover, the printer 200C can be connected to the computers 100a to 100c via a Universal Serial Bus (USB) cable.

Moreover, in FIG. 1, a case where the business chat service 301, the web server 302, the cloud storage 303, the authentication service 304, and the cloud print service 305 are connected to the network NWb is illustrated as an example. Moreover, in FIG. 1, a case where the printers 200a and 200b are connected to the network NWc, which is other than the networks NWa and NWb, is illustrated as an example.

The computers 100a to 100c are able to communicate with the business chat service 301, the web server 302, the cloud storage 303, the authentication service 304, and the cloud print service 305 via the networks NWa and NWb. The computers 100a to 100c are able to communicate with the printers 200a to 200c via the networks NWa to NWc. Each of the networks NWa to NWc can be a small-scale network or can be a large-scale network. For example, each of the networks NWa to NWc can be a personal area network (PAN), can be a local area network (LAN), or can be another type of network. Moreover, as long as each apparatus is able to communicate with another apparatus, the configuration of each network (for example, the number of networks or the scale thereof) is not limited to the configuration illustrated in FIG. 1. Each apparatus can be configured to be able to communicate via the Internet. Moreover, cloud computing can be used to structure the information processing system. Moreover, the communication method is not limited. For example, communications using a wireless LAN compliant with the IEEE 802.11 standard can be used. Moreover, for example, Bluetooth® communication or a communication using a mobile phone line compliant with the International Mobile Telecommunication-2000 (IMT-2000) can be used. Moreover, the connection form for apparatuses using a USB line can be a form of directly connecting apparatuses to each other or can be a form of connecting apparatuses by relaying communications via a USB hub or switching equipment.

Moreover, the number of computers 100a to 100c and the number of printers 200a to 200c are not limited. Moreover, in the first exemplary embodiment, a case where the computers 100a to 100c have the same configuration is illustrated as an example. However, the configurations of the computers 100a to 100c do not need to be the same. In the following description, in a case where the computer concerned can be any one of the computers 100a to 100c, each of the computers 100a to 100c is referred to as a "computer 100" as needed. Similarly, in the first exemplary embodiment, a case where the printers 200a to 200c have the same configuration is illustrated as an example. However, the configurations of the printers 200a to 200c do not need to be the same. In the following description, in a case where the printer concerned can be any one of the printers 200a to 200c, each of the printers 200a to 200c is referred to as a "printer 200" as needed. Moreover, in a case where the network concerned can be any one of the networks NWa to NWc, each of the networks NWa to NWc is referred to as a "network NW" as needed.

FIG. 2A is a diagram illustrating an example of a hardware configuration of the computer 100. Furthermore, the hardware configuration of each of the business chat service 301, the web server 302, the cloud storage 303, the authentication service 304, and the cloud print service 305 can also be implemented with, for example, the configuration illustrated in FIG. 2A. Accordingly, here, the detailed description of a hardware configuration of each of the business chat service 301, the web server 302, the cloud storage 303, the authentication service 304, and the cloud print service 305 is omitted. However, the hardware configurations of the business chat service 301, the web server 302, the cloud storage 303, the authentication service 304, and the cloud print service 305 can be configurations different from each other. Moreover, a function included in at least one of the business chat service 301, the web server 302, the cloud storage 303, the authentication service 304, and the cloud print service 305 can be implemented from a combination of a plurality of apparatuses. Moreover, functions included in at least two of the business chat service 301, the web server 302, the cloud storage 303, the authentication service 304, and the cloud print service 305 can be implemented with one apparatus.

In FIG. 2A, the computer 100 includes a central processing unit (CPU) 101, a main storage device 102, and an auxiliary storage device 105. Moreover, in FIG. 2A, the main storage device 102 includes a read-only memory (ROM) 1021 and a random access memory (RAM) 1022. The CPU 101 controls the entire computer 100 according to a program stored in the main storage device 102 or the auxiliary storage device 105. The RAM 1022 is also used as a work area for the CPU 101 to perform each processing operation. Furthermore, the computer 100 can be configured to include a processor other than CPUs (for example, a graphics processing unit (GPU)). The auxiliary storage device 105 has, stored therein, various programs such as an application 1051, a device application 1052, a general-purpose printer driver 1053, and an operating system (OS) 1054.

The auxiliary storage device 105 is implemented by use of, for example, a hard disk drive (HDD) or a solid state drive (SSD).

In FIG. 2A, the computer 100 includes an input interface (I/F) 103, a keyboard 1031, and a pointing device 1032. The pointing device 1032 includes, for example, a mouse, a touch panel, and a touch-pad. The keyboard 1031 and the pointing device 1032 are an example of an input device used for the user to perform an input operation on the computer 100. The input device can include a device other than the keyboard 1031 and the pointing device 1032. The input device, such as the keyboard 1031 and the pointing device 1032, is connected to the computer 100 via the input I/F 103. The computer 100 receives an operation on the program performed by the user via such an input device.

In FIG. 2A, the computer 100 includes an output I/F 104 and a monitor 1041. An output device such as the monitor 1041 is connected to the output I/F 104. The computer 100 displays various pieces of information on the monitor 1041 according to an instruction of the program.

The computer 100 is able to display a graphical user interface (GUI) on the monitor 1041. Furthermore, in FIG. 2A, the pointing device 1032 and the monitor 1041 are illustrated as being separated for respective roles. However, as a terminal including a smartphone or a tablet terminal, there is a terminal in which the pointing device 1032 and the monitor 1041 are integrated. In such a terminal, the pointing device 1032 and the monitor 1041 can be integrated.

In FIG. 2A, the computer 100 includes a communication I/F 106. The communication I/F 106 is connected to the network NW. The computer 100 is able to communicate with an external apparatus via the communication I/F 106.

The respective modules including the CPU 101, the main storage device 102, the input I/F 103, the output I/F 104, the auxiliary storage device 105, and the communication I/F 106 are able to exchange data via a system bus 107.

For example, programs for performing processing to be described in the first exemplary embodiment are included in the application 1051, the device application 1052, the general-purpose printer driver 1053, and the OS 1054. The application 1051, the device application 1052, the general-purpose printer driver 1053, and the OS 1054 can be added to the auxiliary storage device 105 via a storage medium (not illustrated) (for example, a compact disc-read-only memory (CD-ROM) or a USB memory). Moreover, the application 1051, the device application 1052, the general-purpose printer driver 1053, and the OS 1054 can be added to the auxiliary storage device 105 via the network NW.

Figure 2B:
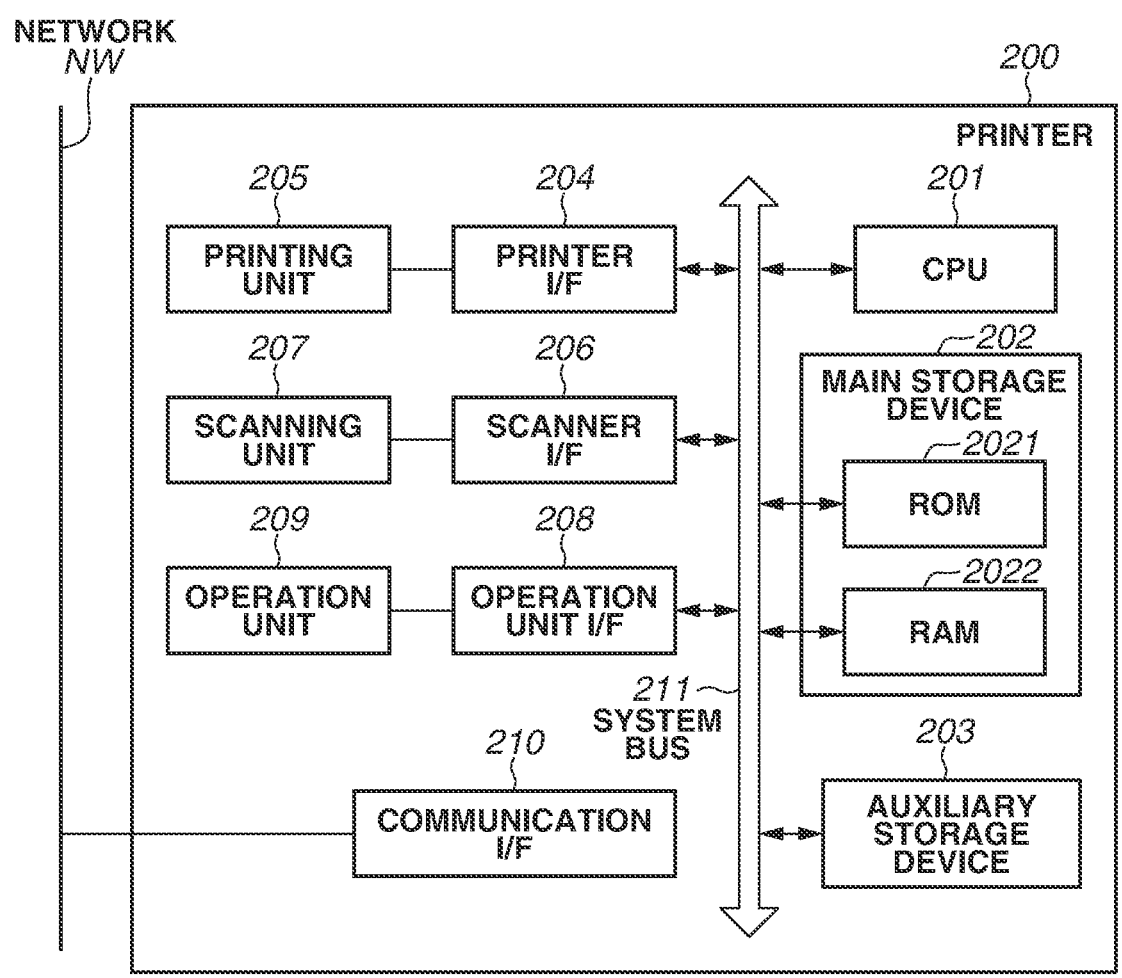
FIG. 2B is a diagram illustrating a hardware configuration of a printer.

FIG. 2B is a diagram illustrating an example of a hardware configuration of the printer 200. In FIG. 2B, a case where the printer 200 is a multifunction peripheral is illustrated as an example. However, the printer 200 is not limited to a multifunction peripheral. For example, the printer 200 can be a printer which does not include a scanner function.

In FIG. 2B, the printer 200 includes a CPU 201, a main storage device 202, and an auxiliary storage device 203. Moreover, in FIG. 2B, the main storage device 202 includes a ROM 2021 and a RAM 2022. The CPU 201 controls the entire printer 200 according to a program stored in the main storage device 202 and the auxiliary storage device 203. The RAM 2022 is also used as a work area for the CPU 201 to perform each processing operation. Furthermore, the printer 200 can be configured to include a processor other than CPUs (for example, a GPU). Various pieces of data such as print data and scanned images are stored in the auxiliary storage device 203. The auxiliary storage device 203 is implemented by use of, for example, a hard disk drive (HDD) and a solid state drive (SSD).

In FIG. 2B, the printer 200 includes a printer I/F 204, a printing unit 205, a scanner I/F 206, a scanning unit 207, an operation unit I/F 208, an operation unit 209, and a communication I/F 210.

The printing unit 205 is connected to the printer I/F 204. The printing unit 205 performs print processing based on, for example, print data received from an external apparatus (for example, the computer 100) or a scanned image generated by the scanning unit 207.

The scanning unit 207 is connected to the scanner I/F 206. The scanning unit 207 generates a scanned image by optically reading an original. A scanned image generated by the scanning unit 207 is printed by the printing unit 205 or is stored in the auxiliary storage device 203.

The operation unit 209 is connected to the operation unit I/F 208. The operation unit 209 includes, for example, a display unit having a touch panel function (for example, a liquid crystal display unit) and a keyboard. The operation unit 209 displays, for example, various operation screens. The user inputs an instruction or information to the printer 200 via the operation unit 209. The operation unit 209 receives an instruction or information input by the user.

The communication I/F 210 is connected to the network NW. The printer 200 is able to communicate with an external apparatus via the communication I/F 210. The various modules including the CPU 201, the main storage device 202, the auxiliary storage device 203, the printer I/F 204, the scanner I/F 206, the operation unit I/F 208, and the communication I/F 210 are able to exchange data via a system bus 211.

Furthermore, unless otherwise stated, as long as the function of the information processing system to be described in the first exemplary embodiment is executed, the configurations of the apparatuses are not limited to the above-mentioned configurations. For example, the information processing system in the first exemplary embodiment can be a single apparatus, can be a system configured with a plurality of apparatuses, or can be a system in which processing is performed with connection performed via a local network.

Figure 3:
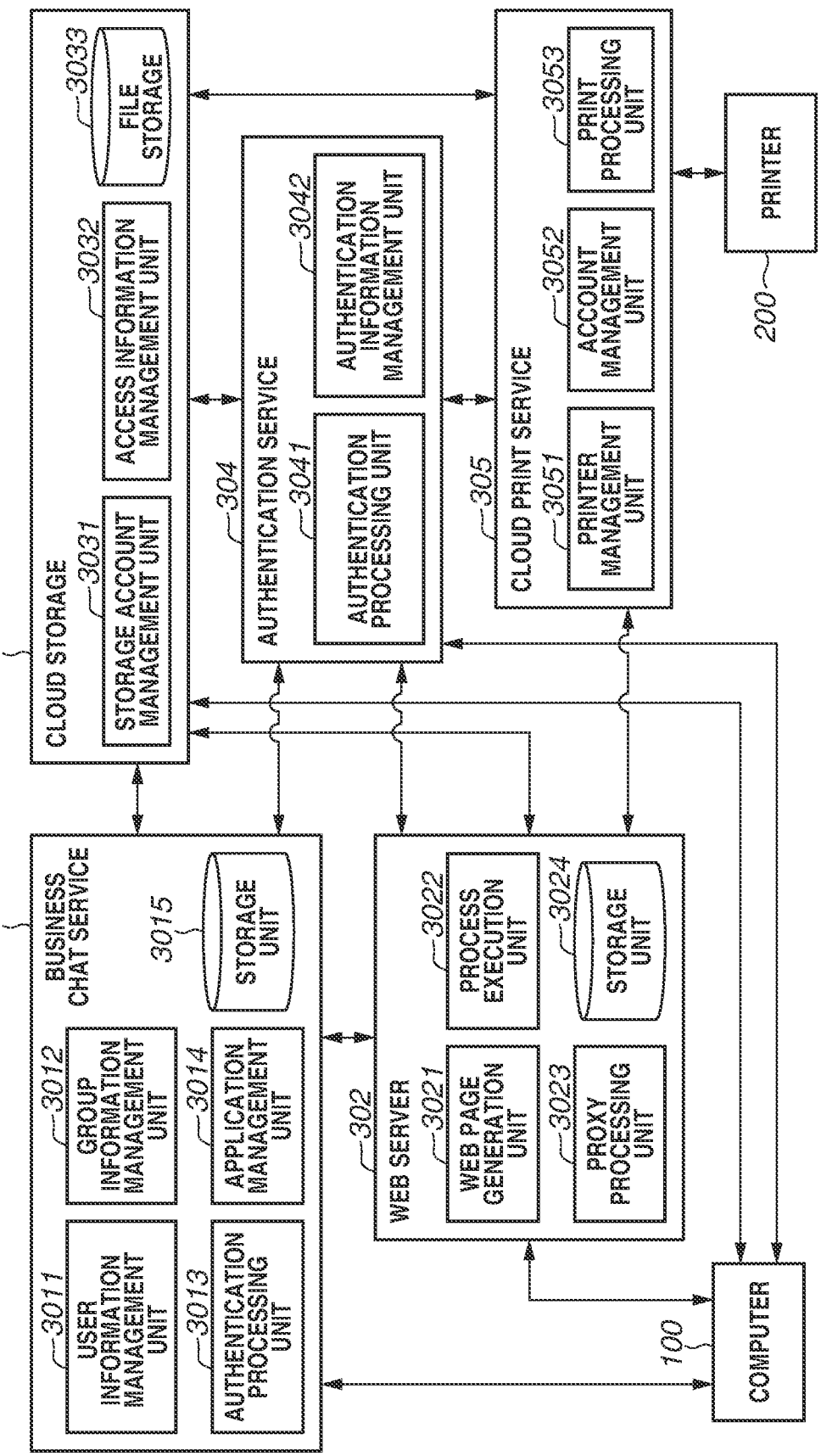
FIG. 3 is a diagram illustrating a functional configuration of the information processing system.

FIG. 3 is a diagram illustrating an example of a functional configuration of the information processing system. In the first exemplary embodiment, a case where printing is performed by the printer 200 with use of a print plug-in which is managed by the business chat service 301.

The user operates the user's own computer 100 to access the business chat service 301. The business chat service 301 provides, for example, character or file exchange using chat. Chat is performed, for example, between individual users, between users belonging to a group, and between the user and an application. Furthermore, in the first exemplary embodiment, a case where the communication which the user performs is mainly chat is illustrated as an example. However, the communication which the user performs is not limited to chat. For example, the communication which the user performs can be, for example, web conferencing. Moreover, chat can be chat which is performed in web conferencing or can be chat which is performed independently from web conferencing.

Moreover, the service which is provided by the business chat service 301 can be a service which is performed on a web browser as a web application or can be a service which runs as a desktop application.

Figure 4:
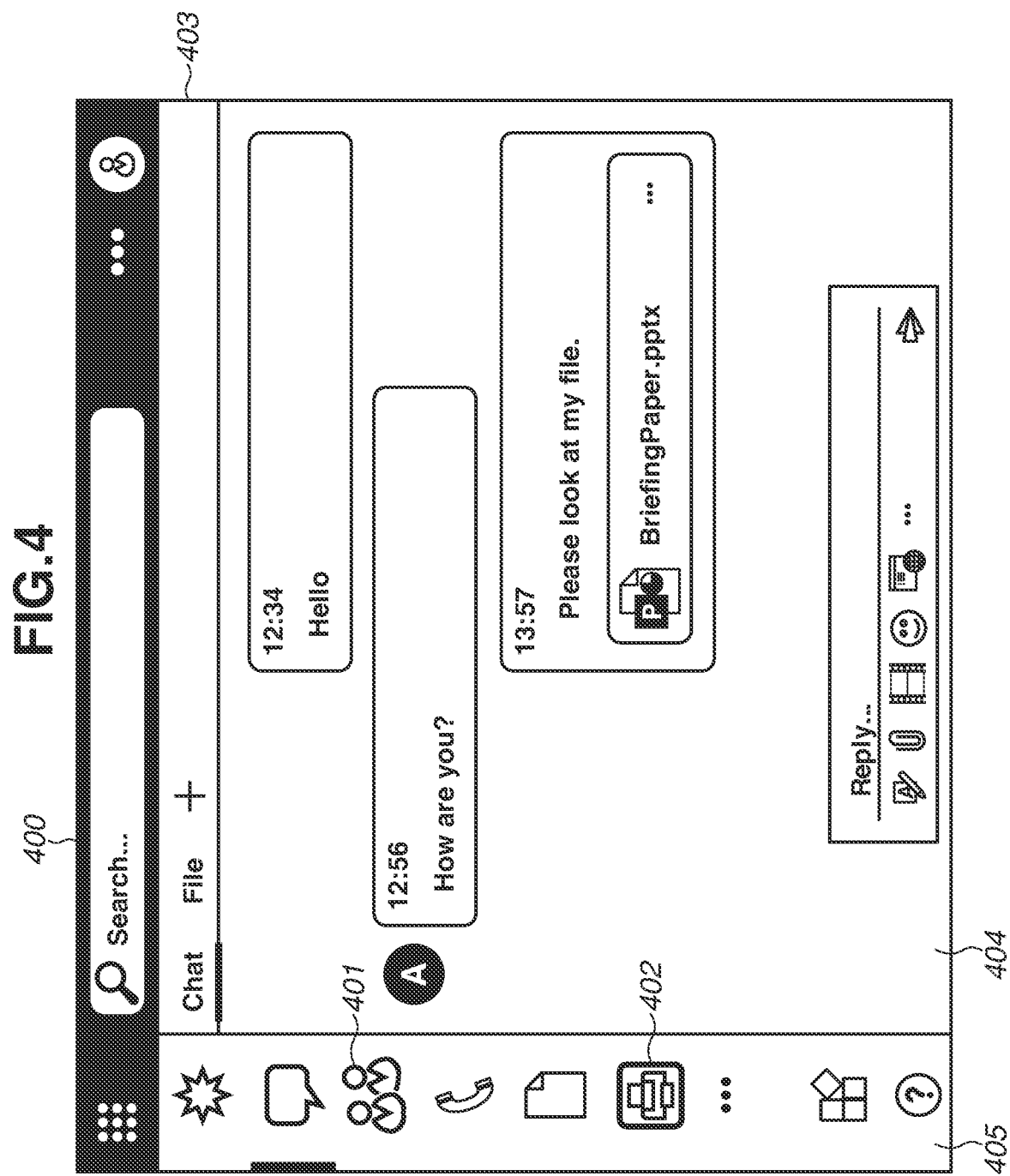
FIG. 4 is a diagram illustrating a first display form of a business chat service screen.

Moreover, in the first exemplary embodiment, a case where the user is allowed to add and use an application in the business chat service 301 is illustrated as an example. More specifically, in the first exemplary embodiment, as such an application, processing for a printing application for performing printing of a file uploaded with use of the business chat service 301 is illustrated as an example. FIG. 4 is a diagram illustrating an example of a business chat service screen 400. For example, the business chat service screen 400 is generated by the web server 302 based on information which is managed by the business chat service 301, and is displayed on the monitor 1041 of the computer 100 at the time of use of the business chat service 301.

In FIG. 4, an area 403 is a tab object used for the user to switch the content to be displayed in an area 404. A "Chat" tab is, for example, a tab which is selected for the user to perform chat with another user. In FIG. 4, a state in which the "Chat" tab is currently selected is illustrated as an example (see a thick line under the "Chat" tab). FIG. 4 illustrates an example of a screen for displaying chat which the user performs with another user on a one-to-one basis or performs with other users on a one-to-plurality basis. A "File" tab is a tab which is selected for the user to view a list of files which users participating in chat have uploaded with use of the business chat service 301.

In a case where the user of the computer 100 which displays the business chat service screen 400 is able to use a printing application, a printing application button 402, which is selected to start up the printing application, is displayed in an application bar 401. Here, a case where, in response to the user pressing the printing application button 402 in the application bar 401, a screen specific to the printing application is displayed to enable the user to perform an operation for performing printing via the displayed screen.

However, an operation for performing printing using a print plug-in such as the printing application is not limited to the above-mentioned operation. For example, a chat room in which the user and the printing application participate can be displayed in the business chat service screen 400. In this case, for example, the user operates a GUI (not illustrated) to select a printing application as a chat partner, thus participating in chat in which the user and the printing application participate. In a chat room sued for performing such chat, the user can perform an operation for performing printing. For example, in the chat room, a tab which is selected in performing printing can be displayed. In response to the tab being selected, a list of files serving as candidates for printing can be displayed. In this case, the user selects a file targeted for printing from the list. The tab and the list are implemented with, for example, those similar to a "Print" tab in an area 501 and a list in an area 502 illustrated in FIG. 5 described below. Moreover, a configuration in which, instead of the tab, a shortcut is used to display a list of files serving as candidates for printing can be employed.

Moreover, the screen for selecting a file targeted for printing is not limited to a screen specific to the printing application in the business chat service 301. For example, the screen for selecting a file targeted for printing can be opened with a window different from a window used before transitioning to the screen concerned. Moreover, the screen for selecting a file targeted for printing can be a screen such as picture-in-picture of Google Chrome® which, within a window used before transitioning to the screen concerned, displays another window in a smaller size or can be a screen which is displayed by another method.

Moreover, a web service using, for example, the web server 302 and the cloud storage 303, which cooperate with the business chat service 301, can be performed with use of a function incorporated in the business chat service 301 or can be performed in cooperation with an external and completely separate service.

The authentication service 304 performs authentication of a user who accesses the business chat service 301, the cloud storage 303, and the cloud print service 305 and, with its authority, gives the user authorization with respect to the respective services. This enables cooperation between the services to be performed smoothly. Furthermore, here, for ease of explanation, a case where an authentication service essentially in common in the respective services is used is illustrated as an example. However, it is not always necessary to do this way. For example, switching between different types of authentication services 304 for the respective services can be performed to perform authentication of the user for each service.

Next, an example of a configuration of the business chat service 301 is described.

In FIG. 3, a user information management unit 3011 is a module which manages information about a user who uses the business chat service 301. The information about a user includes, for example, information about chat which the user performed and information about an application which the user is allowed to use.

FIGS. 6A, 6B, 6C, and 6D are diagrams illustrating examples of pieces of information which are managed by the information processing system in the first exemplary embodiment. FIG. 6A is a diagram illustrating an example of information which is managed by the user information management unit 3011.

In FIG. 6A, the column "User ID" indicates identification information about the user concerned. The column "Domain for Participation" indicates information about a domain to which the user concerned belongs. The column "Channel ID" indicates identification information for identifying a channel to which the user concerned belongs. The column "Group ID" indicates identification information for identifying a group to which the user concerned belongs. The column "Application" indicates information about an application incorporated in the business chat service 301 by the user, for example, installing the application on the business chat service 301 or enabling the application. Information for identifying an application (for example, an identifier (ID)) can be preliminarily stored in the column "Application". Moreover, display information about, for example, pinning of the application or customization information about, for example, setting change can be preliminarily stored in the column "Application". The term "pinning" represents the function of fixedly displaying an icon of the enabled application in an area 405 illustrated in FIG. 4.

In the business chat service 301, it is possible to set whether to perform pinning for each installed application. Information as to whether each application has been pinned is stored in a table illustrated in FIG. 6A. Here, in a case where the user belongs to a plurality of groups or a plurality of channels, IDs (group IDs or channel IDs) the number of which corresponds to the number of groups or channels to which the user belongs are stored. A channel ID of a channel or a group ID of a group in which the user participates is information which is used for displaying a candidate for a file which the printing application prints.

In FIG. 3, a group information management unit 3012 is a module which manages information about chat performed in the group and information about a file which the group has. Moreover, the group information management unit 3012 also performs management of data associated with the group, such as a memo or recorded data about a meeting which was opened in the group. FIG. 6B is a diagram illustrating an example of information which is managed by the group information management unit 3012.

In FIG. 6B, the column "Chat Information ID" indicates identification information for identifying data storing information about text of chat performed in the group concerned and a file or image data uploaded in the chat. The column "File Information" indicates identification information about a file uploaded as a file to be released to users who belong to the group concerned. The column "File Information" can indicate a file path of the file concerned. The column "Meeting ID" indicates identification information for identifying information concerning an online meeting held in the group concerned or an online meeting scheduled to be held in the group concerned. The information concerning an online meeting is, for example, information about a file uploaded in association with an online meeting, text information and image information for chat posted in an online meeting during the meeting, or text information obtained by transcribing voice in an online meeting.

In FIG. 3, an application management unit 3014 is a module which manages information about an application which is usable in the business chat service 301. The application management unit 3014 manages applications corresponding to respective users and respective groups for each user and for each group. The application management unit 3014 manages, for example, both an application which the user has and an application which a group to which the user belongs has and which users included in the group are allowed to use. FIG. 6C is a diagram illustrating an example of information which is managed by the application management unit 3014. FIG. 6C illustrates a situation in which a "User A" has installed a "Printing Application" the version information about which is "Ver. 1.0" and which is usable by accessing "http://xxxx.co.jp". Moreover, a situation in which users participating in a "Group A" are allowed to use a "ToDo List Application" the version information about which is "Ver. 1.1" and which is usable by accessing "http://yyyy.co.jp" is illustrated.

In FIG. 6C, the column "Application ID" indicates identification information for identifying the application concerned. The column "Version Information" indicates information indicating the version of the application concerned. The column "Summary" indicates information indicating the summary of a function which the application concerned has. The column "Reference Information" indicates information concerning an external service or page to which the application concerned refers. The "Reference Information" is, for example, information concerning a service or web page of, for example, a chatbot to which the application concerned refers or a processing agent bot. Furthermore, the information concerning an external service or page to which the application concerned refers can be preliminarily stored in a database or storage located outside the business chat service 301. In this case, information for referring to information about the storage location, such as information indicating a storage location of the information concerning an external service or page to which the application concerned refers, can be preliminarily stored in the "Reference Information".

Moreover, the application management unit 3014 manages, for example, information indicating an execution range of the application and information indicating a display form of the application. The information indicating an execution range of the application is information for defining in which range of a service provided by the business chat service 301 the application is executed. The information indicating a display form of the application is information indicating a method of displaying the application. The information indicating a display form of the application is, for example, information indicating displaying the application as an application for personal use or for a group or information indicating displaying the application as a menu on chat or a custom menu.

Moreover, the application management unit 3014 can manage information indicating a definition for acquiring location information about an apparatus, generating sound, issuing a notification (for example, a notification used for the application to get a permission from the user), or giving permission to execute processing to an external apparatus.

Moreover, the application as mentioned here includes various applications including applications which bear basic functions such as a calling function, a chat function, a conferencing function, and a file management function. For example, the application can be an application for editing a document or spreadsheet data or can be an application which bears the function of accessing or managing a storage on cloud computing. Moreover, the application can be an application having a function serving as a viewer directed to reproducing a multimedia message including a file or video of the format dependent on a specific work such as computer-aided design (CAD). Moreover, the application can be an application having the function of creating a To-do list for personal use or an application having a function serving as task management for performing creation, allocation, and tracking of a personal task or a task which is shared by a team. Moreover, the application can be other than these applications. In the first exemplary embodiment, among these functions, a function in which the computer 100 and the business chat service 301 communicate with the external web server 302 to perform printing via the cloud print service 305 is illustrated as an example. Moreover, a plug-in which is used to execute such a function can be a plug-in located in a store which the business chat service 301 manages or a plug-in which executes the function of a service compatible with the business chat service 301. Moreover, the plug-in which is used to execute such a function can be, for example, a plug-in shared by an individual person or a team by the user locally uploading the plug-in.

In a case where the plug-in is located in a store, for example, the user accesses the page of a store for the business chat service 301 existing inside the application or outside the application. In this case, the user selects a target plug-in from a list of plug-ins displayed in the page concerned and then performs "addition" of the selected plug-in, thus becoming able to use the plug-in concerned. In a case where a plug-in is added in this way, the user information management unit 3011 stores an ID of the plug-in (application) and a user ID while associating them with each other.

Moreover, a group administrator of the business chat service 301 performs "addition as a group" of a plug-in, thus being able to add the plug-in as not a user but a group. In a case where a plug-in is added in this way, the group information management unit 3012 stores an ID of the plug-in (application) and a group ID while associating them with each other.

The plug-in added as a group is displayed, for example, as an option for an icon or menu in a screen which is displayed when a user belonging to the group performs chat. Accordingly, a user belonging to the group is able to, without performing an operation for adding a plug-in (application), use the plug-in. Moreover, a user belonging to the group can upload a plug-in from the local computer 100. In this case, the user can directly add the uploaded plug-in or can cause the uploaded plug-in to be included in a list of plug-ins and add the uploaded plug-in by a selection operation. Moreover, the group administrator can add, from a management page, a plug-in and definition information describing a rule together to a group. In this case, the function of the plug-in is provided in a form conforming to a rule described in the definition information (for example, in a form to which a rule such as hiding a part of the function is applied).

In FIG. 3, an authentication processing unit 3013 is a module which performs processing concerning authentication of a user who uses the business chat service 301, in cooperation with the authentication service 304. For example, the authentication processing unit 3013 performs processing for displaying, on the monitor 1041 of the user, a login screen for receiving inputting of user identification information such as a user ID and a password when the user has accessed the business chat service 301. Additionally, after transmitting information input via the login screen to the authentication service 304, the authentication processing unit 3013 performs processing for receiving a result of authentication that is based on the transmitted information from the authentication service 304 and performing, for example, switching of a screen for the user.

A storage unit 3015 is used to store various pieces of information such as user information, group information, and meeting information.

Next, an example of a configuration of the web server 302 is described. The web server 302 provides the function of supporting printing of a file (for example, a document file or an image file) uploaded via the business chat service 301, in cooperation with a printing application. The printing application is an example of an application for adding a printing function to the business chat service 301.

In FIG. 3, a web page generation unit 3021 is a module which generates screen information concerning printing which the printing application causes to be displayed and then provides the generated screen information to the business chat service 301. In the first exemplary embodiment, a case where the web page generation unit 3021 generates data which is displayable with the HyperText Markup Language (HTML) and provides the generated data to the business chat service 301 is illustrated as an example.

An area 502 illustrated in FIG. 5 is an example of a screen which is displayed based on screen information generated by the web page generation unit 3021 and provided to the business chat service 301. In the area 502 illustrated in FIG. 5, pieces of information concerning files serving as candidates for printing (for example, document files and image files) are displayed. These pieces of information are displayed based on information which the web server 302 has acquired by accessing the business chat service 301 and the cloud storage 303. An example of the details of such displaying is described below.

In FIG. 3, a process execution unit 3022 is a module which controls a program which runs as a servlet with JavaScript of the web server 302. For example, the process execution unit 3022 performs processing responsive to a request from a web page of the business chat service 301.

In FIG. 3, a proxy processing unit 3023 is a module which performs processing in place of the user by gaining permission (approval or acceptance) from the user. For example, the proxy processing unit 3023 performs access to a file which the user manages or access to a region of an external web service to which only the user is allowed to refer.

In FIG. 3, a storage unit 3024 is a module which manages a storage or database which retains information concerning a print job. The information concerning a print job includes, for example, data about a web page which the web server 302 handles, information concerning displaying or setting for each user, data about a file targeted for printing which the web server 302 temporarily handles, and print setting information.

Next, an example of a configuration of the cloud storage 303 is described. The cloud storage 303 provides a service for storing a file or image data uploaded via the business chat service 301. In the first exemplary embodiment, a case where the business chat service 301 and the cloud storage 303 are managed with the same account and, in both services, authentication processing is performed with use of the authentication service 304 is illustrated as an example.

In FIG. 3, a storage account management unit 3031 is a module which runs in cooperation with the authentication service 304 and, when a user accesses the cloud storage 303, performs processing concerning authentication of the user.

A configuration in which, in a case where the account of the cloud storage 303 and the account of the business chat service 301 are in common with each other, if the user preliminarily logs in to a specific domain or directory service, the user is able to collectively acquire respective access rights can be employed.

In FIG. 3, an access information management unit 3032 is a module which manages pieces of information about files uploaded to the business chat service 301 and the cloud storage 303. FIG. 6D is a diagram illustrating an example of information about a file managed by the access information management unit 3032. In FIG. 6D, The column "File Name" indicates the file name of a file stored in the cloud storage 303. The column "File Path" indicates information for accessing the file concerned. The column "User ID/Channel ID/Group ID for Which Access is Permitted" indicates information for identifying a user for which access to the file concerned is permitted. The information can be set by the user for each file or can be automatically set depending on a place to which the file has been uploaded. With regard to this setting, for example, with respect to one file, a plurality of settings can be performed for each owner of the file or for each group to which the owner of the file belongs. Moreover, with regard to this setting, for example, in a case where tree structure folders are targeted, information for designating up to which layer to extend the same read and write authority can be set. A file storage 3033 is a region for storing the body of each file.

Next, an example of a configuration of the authentication service 304 is described. The authentication service 304 provides a service for performing authentication processing for a user who uses the business chat service 301 and the cloud storage 303. As mentioned above, in the first exemplary embodiment, both the business chat service 301 and the cloud storage 303 are assumed to be able to be used with the same account. On the other hand, in the first exemplary embodiment, the cloud print service 305 is assumed to be separately subjected to account management and to be able to be used with an account different from that of the business chat service 301 and the cloud storage 303. However, for example, a configuration in which three services, i.e., the business chat service 301, the cloud storage 303, and the cloud print service 305, are able to be used with one account can be employed.

In FIG. 3, an authentication processing unit 3041 is a module which performs authentication of a user. The authentication method is not limited. For example, the authentication processing unit 3041 performs authentication of a user using at least one of authentication methods including authentication using an ID and a password, face authentication, fingerprint authentication, and pattern authentication.

In FIG. 3, an authentication information management unit 3042 is a module which manages information concerning authentication of a user. For example, the authentication information management unit 3042 manages a destination to which a user belongs (for example, an organization or group to which a user belongs). Moreover, the authentication information management unit 3042 manages authority given to a user and allocates, to the user, an appropriate access right for a file or storage corresponding to the given authority. Moreover, the authentication information management unit 3042 can manage license information purchased by a user and allocate, to the user, a usage authority that is based on the license information.

For example, the authentication information management unit 3042 can allocate, to the user, a usage authority for software, a plug-in, or a service that is based on grade information about a subscription purchased by the user.

Next, an example of a configuration of the cloud print service 305 is described. The cloud print service 305 provides a service for receiving a file or image data from, for example, the computer 100 or the web server 302, generating print data based on the received file or image data, and transmitting the print data to the printer 200. The cloud print service 305 can receive print data generated by, for example, the computer 100 or a web browser and transmit the print data to the printer 200.

In FIG. 3, a printer management unit 3051 is a module which performs processing for managing information about the printer 200 and transmitting the managed information in response to a request from a user or group. For example, the printer management unit 3051 performs processing for transmitting, in response to a request from a user or group, a list of printers 200 corresponding to a scope managed by the user or group. Moreover, the printer management unit 3051 manages capability information about the printer 200 (for example, information indicating the availability or unavailability of duplex printing or the availability or unavailability of color printing), text information (for example, information indicating explanatory text or supplemental text of the administrator), and position data (for example, positioning information or address information obtained by the Global Positioning System (GPS)). Moreover, the printer management unit 3051 performs processing for transmitting these pieces of information in response to a request from a user or a group. Furthermore, information about the printer 200 which is managed by the printer management unit 3051 can be, even if being acquired from the printer 200, updated by being manually edited by the user.

In FIG. 3, an account management unit 3052 is a module which manages an account for the printer 200. For example, the account management unit 3052 manages information indicating an administrator of the printer 200 (for example, information indicating which user or which group manages the printer 200). Moreover, the account management unit 3052 manages information indicating sharers of the printer 200 (for example, information indicating which users or which groups share the printer 200).

In FIG. 3, a print processing unit 3053 is a module which performs processing required for printing by the printer 200. For example, the print processing unit 3053 performs, in addition to management of print setting or conversion of data for each service, conversion to print data such as rendering of a file as needed.

Next, an example of processing in the information processing system for performing printing using a printing application is described. For example, if the printing application is installed and incorporated into the business chat service 301, as illustrated in FIG. 4, a printing application button 402 is displayed in a business chat service screen 400. The business chat service screen 400 is displayed on the monitor 1041 of the computer 100 of a participant in chat which is performed with use of the business chat service 301. In the first exemplary embodiment, a case where the printing application button 402 is displayed in all of the screens 400 of participants in the chat is illustrated as an example. However, the printing application button 402 can be displayed not in the screens 400 of all of the participants in the chat but in the screens 400 of some participants in the chat. For example, the printing application button 402 can be configured to be displayed in the business chat service screen 400 of a user who has authority to use the printing application but not to be displayed in the business chat service screen 400 of a user who does not have the authority.

When the user presses the printing application button 402 in the business chat service screen 400 illustrated in FIG. 4, the printing application starts to run. When the printing application starts to run, in response to the operation of the printing application, a list of files which the user is using in the business chat service 301 is acquired. Then, processing for transitioning the business chat service screen 400 illustrated in FIG. 4 to a business chat service screen 500 illustrated in FIG. 5 is performed. With this processing, displaying of the areas 403 and 404 of the business chat service screen 400 switches to displaying of areas 501 and 502 illustrated in FIG. 5, respectively. The business chat service screen 500 illustrated in FIG. 5 is a screen in which display contents shown in the areas 403 and 404 of the business chat service screen 400 illustrated in FIG. 4 have been changed to display contents shown in the areas 501 and 502. To clearly specify which of the areas illustrated in FIG. 4 and FIG. 5 is being described, respective different reference characters are assigned with respect to the areas 403 and 404 illustrated in FIG. 4 and the areas 501 and 502 illustrated in FIG. 5. However, the areas 403 and 501 differ only in display contents. Similarly, the areas 404 and 502 differ only in display contents. Displaying of the areas 403 and 404 represents an example of displaying in a case where chat is performed, and displaying of the areas 501 and 502 represents an example of displaying in a case where printing using the printing application is performed. Similarly, to clearly specify which of the screens illustrated in FIG. 4 and FIG. 5 is being described, respective different reference characters are assigned with respect to the business chat service screen 400 illustrated in FIG. 4 and the business chat service screen 500 illustrated in FIG. 5.

In the area 502 in the business chat service screen 500 illustrated in FIG. 5, a file targeted for printing is selected. An example of this processing is described below with reference to the flowchart of FIG. 10. Then, when the user presses a print setting call button 503 displayed in the area 502, a print setting screen 701 illustrated in FIG. 7 is displayed. The user operates the print setting screen 701 to perform print setting on a file targeted for printing. Displaying of the print setting screen 701 is performed based on, for example, registration information about the user or personal information about the user which is managed by the cloud print service 305. An example of processing concerning print setting and an example of the print setting screen 701 illustrated in FIG. 7 are described together with the description of the flowchart of FIG. 11 described below.

Here, the outline of business chat service screen 500 illustrated in FIG. 5 is described. The area 501 is a tab object for switching contents to be displayed in the area 502. In the first exemplary embodiment, a case where a web page is displayed in the area 502 is illustrated as an example.

The "Print" tab is a tab for displaying a list of files serving as candidates for printing in such a way to enable the user to select a file targeted for printing. In the first exemplary embodiment, a case where, when the "Print" tab has been selected, a list of files which a user who is participating in chat with use of the business chat service 301 accessed is displayed as a list of files serving as candidates for printing in the area 502 is illustrated as an example.

In the first exemplary embodiment, a case where a file serving as a candidate for printing included in the list displayed in the area 502 is identified based on access time of the file is illustrated as an example. The access time of a file is, for example, time (timing) at which the file was last accessed.

Here, users who accessed files serving as candidates for printing included in the list displayed in the area 502 can be, for example, all of the users participating in chat with use of the business chat service 301. Moreover, users who accessed files serving as candidates for printing included in the list displayed in the area 502 can be only users satisfying a specific condition out of the users participating in chat with use of the business chat service 301. The users satisfying the specific condition are, for example, users who are logged in to the business chat service 301. Moreover, in a case where users are participating in chat in a group, users who accessed files serving as candidates for printing included in the list displayed in the area 502 can be users included in the group.

A period for which a file serving as a candidate for printing included in the list displayed in the area 502 was accessed can include a period for which the business chat service 301 was being used. Moreover, a period for which a file serving as a candidate for printing included in the list displayed in the area 502 was accessed can include a period before the use of the business chat service 301 was started.

A file serving as a candidate for printing included in the list displayed in the area 502 can include a file associated with chat which is performed with use of the business chat service 301. Moreover, a file serving as a candidate for printing included in the list displayed in the area 502 can include, for example, a file which an individual user is individually managing at first hand irrespective of whether the user uses the file at the time of use of the business chat service 301. Furthermore, it is favorable that a file serving as a candidate for printing included in the list displayed in the area 502 is a file which is being managed in the cloud storage 303.

Moreover, in a list of files serving as candidates for printing displayed in the area 502, for example, pieces of information about files are displayed in the order of access time in such a manner that a file with newer access time (time closer to current time) is displayed in an upper row. However, the sequential order of files in a list of files serving as candidates for printing is not limited to the above-mentioned sequential order. For example, pieces of information about files can be displayed in such a manner that a file with newer access time for each user is displayed in an upper row. Moreover, pieces of information about files can be displayed in such a manner that a file with newer access time in a period designated by the user is displayed in an upper row. Moreover, pieces of information about files can be displayed in the order of access time in such a manner that a file with older access time is displayed in an upper row. Information about a file serving as a candidate for printing displayed in the area 502 includes information for causing the user to recognize the file.

In FIG. 5, a case where information about a file includes columns "Type", "Name", "Modified", and "Location" is illustrated as an example. The column "Type" indicates a file type of the file. The column "Name" indicates a file name of the file. The column "Modified" indicates date and time information at which a user who was able to access the file last accessed the file. The column "Modified" indicates date and time at which the user last accessed the file, and, therefore, indicates data and time which is not involved in whether there is a change in the content of the file. Furthermore, in the first exemplary embodiment, the column "Modified" indicates access date and time of the file, but can indicate update date and time of the file. The column "Location" indicates a storage location of the file.

In the first exemplary embodiment, a case where, in the order of files with newer access time, files which users who are participating in chat with use of the business chat service 301 accessed are extracted and are displayed in a list displayed in the area 502 is illustrated as an example. In this case, it is favorable to attach a condition to a file to be extracted. This enables, for example, preventing or reducing a number of files which are unable to be completely displayed in a list from being extracted or preventing or reducing a file which is not targeted for printing from being included in a list. Accordingly, it is possible to facilitate selection of a file targeted for printing by the user. The condition for extracting a file is not limited as long as it is possible to narrow down files to be included in a list.

Moreover, a case where, in a list of files serving as candidates for printing displayed in the area 502, checkboxes for enabling the user to select respective files are displayed together with pieces of information about the files is illustrated as an example. In the first exemplary embodiment, a case where, depending on a checkbox being checked or unchecked, information indicating whether a file has been selected is displayed is illustrated as an example. For example, FIG. 5 illustrates a case where a file "Sample.pptx" has been selected as a target for printing. On the other hand, in FIG. 5, files other than the file "Sample.pptx" are not selected as files to be printed.

Moreover, in the first exemplary embodiment, a case where, at a stage where a list of files serving as candidates for printing has been displayed in the area 502, a checkbox corresponding to at least one file has entered into a state of being checked by default is illustrated as an example. In this way, causing a checkbox corresponding to at least one file to enter into a state of being checked without recourse to a selection operation of the user enables, for example, saving the user the trouble of selecting a file. Furthermore, when not wanting to print a file corresponding to a checkbox checked by default, the user is able to uncheck the checkbox.

In the first exemplary embodiment, a case where the number of checkboxes which are in a state of being checked at a stage where a list of files serving as candidates for printing has been displayed in the area 502 (by default) is one is illustrated as an example. However, the number of checkboxes which are in a state of being checked at a stage where a list of files serving as candidates for printing has been displayed in the area 502 can be two or more.

In the first exemplary embodiment, a case where, when there is a file satisfying a condition relatively high in priority as a condition for a file the checkbox of which is displayed in a checked state by default, a checkbox corresponding to the file is brought into a state of being checked is illustrated as an example. Moreover, a case where, when there is no file satisfying such a condition, a checkbox corresponding to a file satisfying a condition relatively low in priority as a condition for a file the checkbox of which is displayed in a checked state by default is brought into a state of being checked is illustrated as an example. With the above-mentioned cases employed, it is possible to preferentially select a file highly likely to be selected by the user as a file targeted for printing and bring a checkbox corresponding to the file into a state of being checked. Moreover, even if there is not such a file, it is possible to reduce (or make zero) the probability that a checkbox which is in a state of being checked at a stage where a list of files serving as candidates for printing has been displayed does not exist. Furthermore, without giving order of priority to a condition for a file the checkbox of which is displayed in a state of being checked by default, a plurality of conditions can be set as the same-level conditions. Moreover, in the following description, a condition for a file the checkbox of which is displayed in a state of being checked by default is referred to as a "default check condition" as needed. In the first exemplary embodiment, the default check condition is an example of a default display condition. Furthermore, a specific example of the default check condition is described in the description of the flowchart of FIG. 10 described below.

Furthermore, in a case where, since the number of files displayed in a list is large, it is impossible to display all of the files in the area 502 at a time, for example, it is favorable to use a scroll bar 504 as illustrated in FIG. 5 to enable the user to view pieces of information about the respective files and select a file targeted for printing.

In FIG. 5, the "Chat" tab is a tab which is selected when the printing application and the user perform chat on a one-to-one basis. When the "Chat" tab is selected, a screen (chat room) used for the printing application and the user to perform chat on a one-to-one basis is displayed in the area 502. For example, when the user posts a file (for example, a document file or image file) to a chat room in which the printing application and the user participate, the printing application causes a message or screen for printing the posted file to be displayed. In this way, in the first exemplary embodiment, a case where using the "Chat" tab enables using a printing function without using the "Print" tab is illustrated as an example.

In FIG. 5, the "File" tab is a tab which is selected for the user to view a list of files (for example, document files or image files) transmitted via chat to the printing application in response to an instruction from the user. When the "File" tab is selected, a list of files which the user has transmitted via chat to the printing application is displayed in the area 502. The printing application can include the function of printing a file which the user has selected from the files displayed in the list.

In FIG. 5, the "Wiki" tab is a tab which is selected for the user to view information such as how to use the printing application. When the "Wiki" tab is selected, a hint page about, for example, how to use the printing application is displayed in the area 502. It is favorable that the hint page is a page which is able to be edited by the user.

Furthermore, in a case where the user wants to use the printing application with an account different from the account which the user has used when logging in to the business chat service 301, the user needs to perform a switching operation for accounts. An example of the switching operation for accounts is described with reference to FIG. 8 and FIG. 9.

FIG. 8 is a diagram illustrating an example of a login screen for the business chat service 301. In FIG. 8, when an object 801 is selected, a login screen 802 is displayed. Information "User01" displayed in the login screen 802 is information about an account with which the business chat service 301 is currently logged in to. Information "testuser01@another.cloud.com" displayed in login screen 802 is information about an account which was used when the business chat service 301 was previously logged in to. When selecting the information "testuser01@another.cloud.com" and inputting a password corresponding to the account concerned, the user is able to log in to the business chat service 301 with an account corresponding to the information "testuser01@another.cloud.com". When logging in to the business chat service 301 with an account which is not displayed in the login screen 802, the user selects an area 803.

Figure 9:
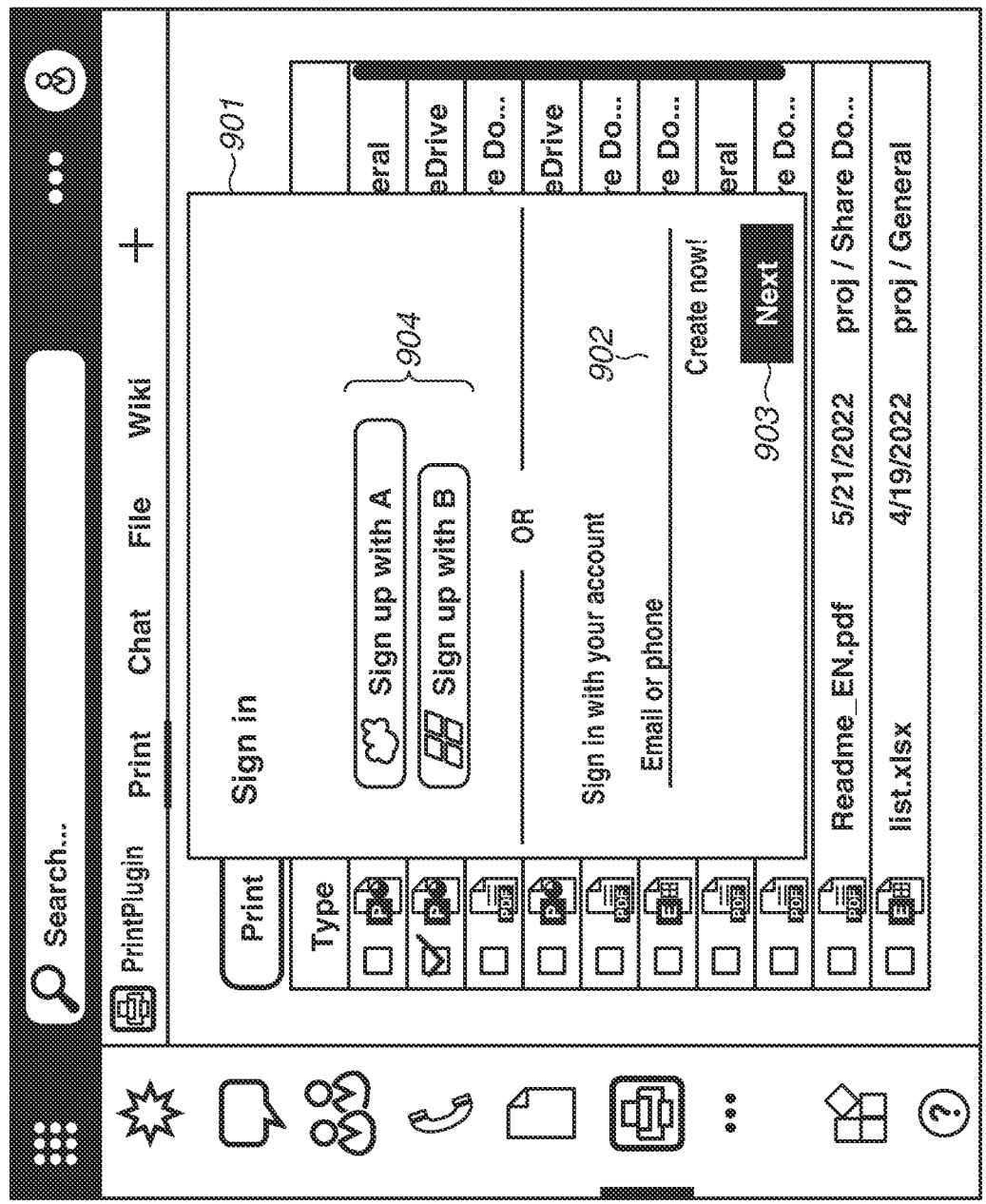
FIG. 9 is a diagram illustrating an authentication screen.

FIG. 9 is a diagram illustrating an example of an authentication screen 901 which is displayed when the area 803 has been selected. For example, the user inputs a user ID to an area 902 and then selects a "Next" button 903. Additionally, the user inputs a password in a screen (not illustrated). The business chat service 301 transmits the input user ID and password to the authentication service 304 and then receives a result of authentication from the authentication service 304. If authentication is successful, an account with which the business chat service 301 is logged in to is switched, so that the business chat service screen 500 illustrated in FIG. 5 is displayed. Moreover, in an area 904, an object used to log in to the business chat service 301 with use of the account of a service different from the business chat service 301 is displayed. In a case where the user has logged in to the business chat service 301 with another account, files displayed in the business chat service screen 500 are files which are identified based on user information about the user who has newly logged in.

Next, an example of processing which the web server 302 performs in the first exemplary embodiment is described.

First, an example of processing for displaying a list of files serving as candidates for printing shown in the area 502 in the business chat service screen 500 illustrated in FIG. 5 is described.

Figure 10:
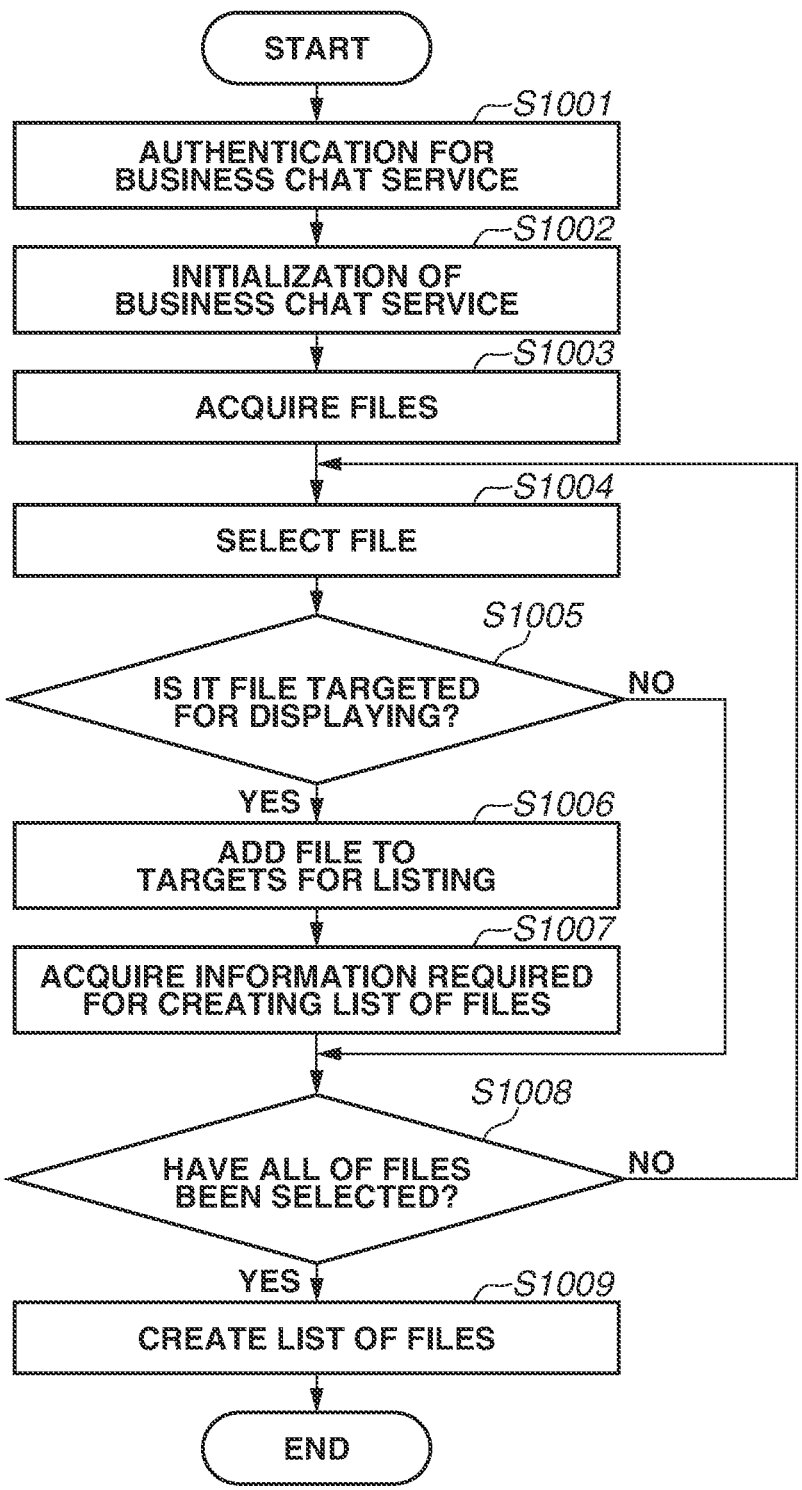
FIG. 10 is a flowchart illustrating selection processing for a file targeted for printing.

To start up the printing application, the user presses the printing application button 402 in the business chat service screen 400 illustrated in FIG. 4. Then, the business chat service screen 500 illustrated in FIG. 5 is displayed. When the printing application button 402 is pressed, processing illustrated in the flowchart of FIG. 10 is performed. Here, for ease of explanation, a case where, in the business chat service screen 500 illustrated in FIG. 5, a list of files serving as candidates for printing is displayed in a state in which the "Print" tab has been selected by default in the printing application is described as an example. However, that does not always have to be the case. For example, at the time of start-up of the printing application, a print setting screen 701 illustrated in FIG. 7 described below can be displayed prior to the business chat service screen 500 illustrated in FIG. 5.

In such a case, after print setting using the print setting screen 701 has been performed, a file targeted for printing is selected from a list of files serving as candidates for printing displayed in the area 502 in the business chat service screen 500.

The authentication service 304 performs authentication for the business chat service 301 based on a request from the web server 302. Then, in step S1001, the web server 302 receives a result of authentication for the business chat service 301 from the authentication service 304. The web server 302 receives, from the business chat service 301, user information (for example, a user ID and password) about a user who is logged in to the business chat service 301. The web server 302 transmits the user information received from the business chat service 301 to the authentication service 304, thus acquiring an access token of the user concerned from the authentication service 304. The access token is used to, for example, acquire information about files serving as candidates for printing from the cloud storage 303 or acquire a file designated by the user.

Next, in step S1002, the web server 302 performs initialization of the business chat service 301. The web server 302 performs initialization of the environment for the business chat service 301, and makes preparations for accessing a resource. Furthermore, the initialization of the environment for the business chat service 301 can be performed on a web page distributed from the web server 302.

For example, the web server 302 acquires, in addition to a user name and user ID and a group name and group ID to which the user belongs, for example, an ID of a session or channel in the state of being connected, information about login or authority, and locale information concerning the region and language required for displaying of various pieces of information.

Moreover, with regard to the web server 302, when the printing application button 402 in the business chat service screen 400 illustrated in FIG. 4 is pressed to invoke the printing application, a file is assumed to be currently displayed in the area 403 in the business chat service screen 400. In this case, the web server 302 can acquire information about the displayed file. For example, in response to the user accessing a document file stored in the cloud storage 303 with use of the business chat service 301, the document file is assumed to be currently opened. At this time, in the area 403 illustrated in FIG. 4, the opened document file is displayed. In this state, in response to the user pressing the printing application button 402, the printing application is assumed to be started up. In this case, the web server 302 inquires of the business chat service 301 and acquires information about the currently opened document file from the business chat service 301.

Moreover, in the area 403 illustrated in FIG. 4, a chat screen or a web conferencing screen is assumed to be currently displayed. In this state, in response to the user pressing the printing application button 402, the printing application is assumed to be started up. In this case, the web server 302 can inquire of the business chat service 301 and acquire, from the business chat service 301, information about a file stored in the cloud storage 303 while being associated with the chat or web conferencing being currently opened.

If, besides information about the above-mentioned file, there is information about a file which is able to be acquired as a file serving as a candidate for a file targeted for printing, the web server 302 can acquire information about the file concerned.

For example, a specific schedule is assumed to be selected from a calendar in a schedule screen and the details of the selected schedule are assumed to be currently displayed in the area 403 illustrated in FIG. 4. In this state, in response to the user pressing the printing application button 402, the printing application is assumed to be started up. In this case, the web server 302 can inquire of the business chat service 301 and acquire, from the business chat service 301, information about a file stored in the cloud storage 303 while being associated with the selected schedule. Moreover, there is assumed to a schedule in which timing (current time) at which the user has pressed the printing application button 402 is included in an opening period (a schedule in which, at current time, start time has passed but ending time has not yet passed). In this case, the web server 302 can inquire of the business chat service 301 and acquire information about a file stored in the cloud storage 303 while being associated with the schedule concerned.

Moreover, for example, in a case where a file which the user has accessed is a file with a specific extension, the web server 302 can acquire information about the file concerned. Moreover, for example, the web server 302 can acquire information about a file updated during a period from timing a fixed period before timing at which the printing application button 402 was pressed to timing at which the printing application button 402 was pressed.

Information about a file which the web server 302 acquires in the above-mentioned way only needs to be information capable of uniquely identifying a file, such as a file name, an ID, or a Uniform Resource Identifier (URI).

Next, in step S1003, the web server 302 acquires, from the cloud storage 303, a list of files which the user who is participating in chat with use of the business chat service 301 accessed. Specifically, the web server 302 acquires a predetermined number of files which the user who is logged in to the business chat service 301 is able to access, in the order of access date and time for files. A list of the files acquired here is not particularly limited as long as it is a list of files which the user concerned accessed. For example, a file included in the list can be a file associated with an individual person or a group, such as a file which the user referred to recently or a file which was recently referred to in the group. Moreover, a file included in the list can be a file which was acquired by the user directly designating a specific drive or folder. Moreover, a file included in the list can be a file which was searched for with a specific keyword. Moreover, a file included in the list can be a file which was accessed based on specific information provided by the business chat service 301. Examples of such a file include a file which the user accessed based on information about a file related to the user identified based on, for example, an operation history of the user and presented to the user together with a comment such as "a file related to you". Furthermore, here, files for information acquired in step S1002 are assumed to be entirely acquired in step S1003.

Next, in step S1004 to step S1008, the web server 302 creates a list of files serving as candidates for printing, while targeting at all or some of the files acquired in step S1003.

First, in step S1004, the web server 302 selects one of files targeted for selection in this step, out of the files acquired in step S1003. The files targeted for selection in this step (S1004) can be all of the files acquired in step S1003 or can be some of the files acquired in step S1003. In the first exemplary embodiment, a case where, in step S1004, files are selected in order from a file with the newest access time (time of the last access) is illustrated as an example. The number of files targeted for selection is defined according to, for example, the number of files which are able to be included in a list displayed in the area 502 illustrated in FIG. 5. In a case where it is supposed that noise (for example, a file not targeted for displaying in a list of files serving as candidates for printing) is included in the files acquired in step S1003, it is favorable that files the number of which is greater than the upper limit value of the number of files which are able to be included in the list are selected.

Furthermore, there is a case where the number of files which are able to be acquired at a time by, for example, a web application programming interface (API) is limited by an upper limit (for example, only twenty files are able to be acquired at a time) and an ID or link for acquiring subsequent data is appended to the last of a result of acquisition of files. In this case, the web server 302 acquires files up to a predetermined number of files with use of the ID or link. At this time, separately from the list creation processing, the web server 302 can acquire files with use of another thread in the background.

Next, in step S1005, the web server 302 determines whether the file selected in step S1004 is a file satisfying a condition for a file to be included in a list displayed in the area 502 in the business chat service screen 500. This condition is an example of the above-mentioned extraction condition for a file. A specific example of a determination as to whether the file satisfies such a condition is described as follows.

For example, the web server 302 can determine whether the type of the file selected in step S1004 is a type of file (the extension of a file name or Multipurpose Internet Mail Extensions (MIME) Type) which is supported in the business chat service 301. Moreover, for example, the web server 302 can determine whether the size of the file selected in step S1004 satisfies a predetermined condition. For example, the web server 302 can determine that, out of a file the size of which exceeds an upper limit value and a file the size of which falls below a lower limit value, at least one of the files is not a file targeted for printing. Moreover, the web server 302 can determine whether the file selected in step S1004 is a file satisfying a predetermined condition created by a combination of the types and sizes of files. In this case, for example, a condition for sizes of files can be set for each type of file (for example, the lower limit value of size for a text file can be set smaller than the lower limit value of size for a Portable Document Format (PDF) file). Moreover, for example, the web server 302 can determine whether the file selected in step S1004 is a file which is able to be printed (for example, whether the file selected in step S1004 is a file for which the restriction in printing is set). Moreover, for example, the web server 302 can determine whether the file selected in step S1004 is a file the access time (the last access time) of which is old (a file from the access time of which a fixed time has elapsed). Moreover, for example, the web server 302 can determine whether files the number of which exceeds the maximum number of files which are able to be displayed in the list have been selected in step S1004.

Furthermore, as mentioned above, here, a case where, in step S1003, a list of files which the user who is participating in chat with use of the business chat service 301 accessed is acquired from the cloud storage 303 is illustrated as an example. Accordingly, a file to be selected in step S1005 is one of files which such a user accessed. However, a file which a user other than the user who is participating in chat with use of the business chat service 301 accessed can be included in files to be acquired in step S1003. In this case, for example, in step S1005, the web server 302 determines whether the user who accessed the file selected in step S1004 is a user who is participating in chat with use of the business chat service 301.

Moreover, as mentioned above, here, a case where, in step S1004, files are selected in order from a file the access time (the last access time) of which is newer is illustrated as an example. However, it is not always necessary to do this way. In the case of doing this way, for example, in step S1005, the web server 302 can determine whether the access time is within a period from time a fixed time before the current time to the current time, so as to prevent a file the access time of which is old from being included in the list.

Moreover, for example, the web server 302 can determine whether the file selected in step S1004 is not a usual attached file (for example, whether the file selected in step S1004 is special data such as a greeting card or a pictogram). Moreover, for example, the web server 302 can determine whether the file selected in step S1004 is a file becoming noise such as management information about the system. Moreover, for example, the web server 302 can dynamically change a condition under which a result of the determination in step S1005 is Yes (for example, the type of a file depending on which a result of the determination in step S1005 is Yes), according to the type of the cloud print service 305 which is enabled by the user.

Thus far is a specific example of the determination condition in step S1005, but the determination condition is not limited the specific example.

If, in step S1005, it is determined that the file selected in step S1004 is not a file satisfying a condition for a file to be included in a list displayed in the area 502 in the business chat service screen 500 (NO in step S1005), the web server 302 advances the processing to step S1008 described below. On the other hand, if, in step S1005, it is determined that the file selected in step S1004 is a file satisfying a condition for a file to be included in a list displayed in the area 502 in the business chat service screen 500 (YES in step S1005), then in step S1006, the web server 302 adds the selected file to targets for listing.

Next, in step S1007, the web server 302 acquires information required for creating a list of the files selected in step S1004. For example, in the case of creating a list such as that shown in the area 502 in the business chat service screen 500 illustrated in FIG. 5, the web server 302 acquires information about a file name, a file type, update date and time, and a storage location of the file selected in step S1004. However, information required for creating a list of files serving as candidates for printing is set depending on information about files displayed in the list. Accordingly, information to be acquired in step S1007 is not limited to these pieces of information. For example, information to be acquired in step S1007 can be, for example, the name or ID of a user or group, the summary of a file, and the name of a cloud storage in which a file is located. Moreover, in a case where, for example, a thumbnail image is included in information about files displayed in a list of files serving candidates for printing, the web server 302 acquires an image required for displaying.

The web server 302 determines whether, in information about the file acquired in step S1002, there is information about a file satisfying a condition relatively high in priority as a default check condition. If it is determined that there is a file satisfying the condition, the web server 302 adds, to the file, a flag indicating that the file is a file the checkbox of which is to be checked by default. For example, a file which is currently displayed in the area 403 when the printing application button 402 in the business chat service screen 400 has been pressed (at the time of invoking the printing application) is an example of a file satisfying the condition. Furthermore, in a case where, in step S1002, only information about a file satisfying a condition relatively high in priority as a default check condition is acquired, it is not necessary to perform the above-mentioned determination. At this time, in a case where, in step S1002, information about a file has not been acquired, the web server 302 determines that there is no file satisfying a condition relatively high in priority as a default check condition.

Next, in step S1008, the web server 302 determines whether the web server 302 has selected all of the files targeted for selection in step S1004. If it is determined that the web server 302 has not yet selected all of the files targeted for selection in step S1004 (NO in step S1008), the web server 302 returns the processing to step S1004. Processing operations in step S1004 to step S1008 are repetitively performed until, in step S1008, it is determined that the web server 302 has selected all of the files targeted for selection.

Then, if, in step S1008, it is determined that the web server 302 has selected all of the files targeted for selection (YES in step S1008), then in step S1009, the web server 302 creates a list of files to be displayed in the business chat service screen 500 illustrated in FIG. 5, based on the information acquired in step S1007. At this time, in addition to the information acquired in step S1007, the web server 302 performs, for example, allocation of checkboxes and internal IDs in such a way as to enable the user to check a checkbox for each file. Moreover, the web server 302 performs shape forming of display time (for example, in the case of 10 minutes before the time, conversion into "10 m ago"). Moreover, the web server 302 performs allocation of JavaScript and application of a style sheet required for control of displaying (extension or change of a behavior at the time of click or a behavior at the time of mouseover).

Moreover, in a case where there is a file to which the flag has been added in step S1007, the web server 302 brings a checkbox for the file into a state of being checked. Furthermore, here, a case where a flag is added to a file the checkbox of which is checked by default has been illustrated as an example.

However, the method of identifying a file the checkbox of which is checked by default is not limited to the method of adding a flag to the file. Moreover, the determination of a file the checkbox of which is checked by default can be performed in a step other than step S1007. For example, the web server 302 can determine a file the checkbox of which is checked by default at a stage where the web server 302 has acquired information about a file in step S1002, or can determine the file concerned in the present step S1009.

On the other hand, in a case where there is no file to which the flag has been added in step S1007, the web server 302 brings a checkbox for a file satisfying a condition relatively low in priority as a default check condition into a state of being checked. As mentioned above, a file the access time of which is newest is an example of the file satisfying the condition concerned. For example, in a list of files serving as candidates for printing to be displayed in the area 502, in a case where pieces of information about files are displayed in the order of access time in such a manner that a file the access time of which is newer is displayed in an upper row, a checkbox for a file displayed in the uppermost row is checked.

In the first exemplary embodiment, a case where, in such a manner that, in the files acquired in step S1003, a file satisfying a condition relatively low in priority as a default check condition necessarily exists, the condition is defined is illustrated as an example. However, it is not always necessary to do this way. In this case, it could be that there is no file satisfying a default check condition.

Moreover, in the first exemplary embodiment, a case where the default check condition includes two conditions, i.e., a condition relatively high in priority and a condition relatively low in priority, has been illustrated as an example. However, the priority does not need to be assigned to these conditions. For example, a file satisfying at least one condition out of a plurality of conditions can be set as a file the checkbox of which is checked by default.

The web server 302 performs the above-described processing to acquire files from the cloud storage 303 and transmit information about the business chat service screen 500 illustrated in FIG. 5 to the computer 100 of a user who is participating in chat. With this processing, as illustrated in FIG. 5, a list of files serving as candidates for printing is displayed on the monitor 1041 of the computer 100 of the user. Moreover, a checkbox for a file satisfying a default check condition enters into a state of being checked by default. Accordingly, it is possible to reduce the user's trouble of selecting a file targeted for printing, in a case where a plurality of users shares files with use of a tool for performing communication via a network.

Figure 11:
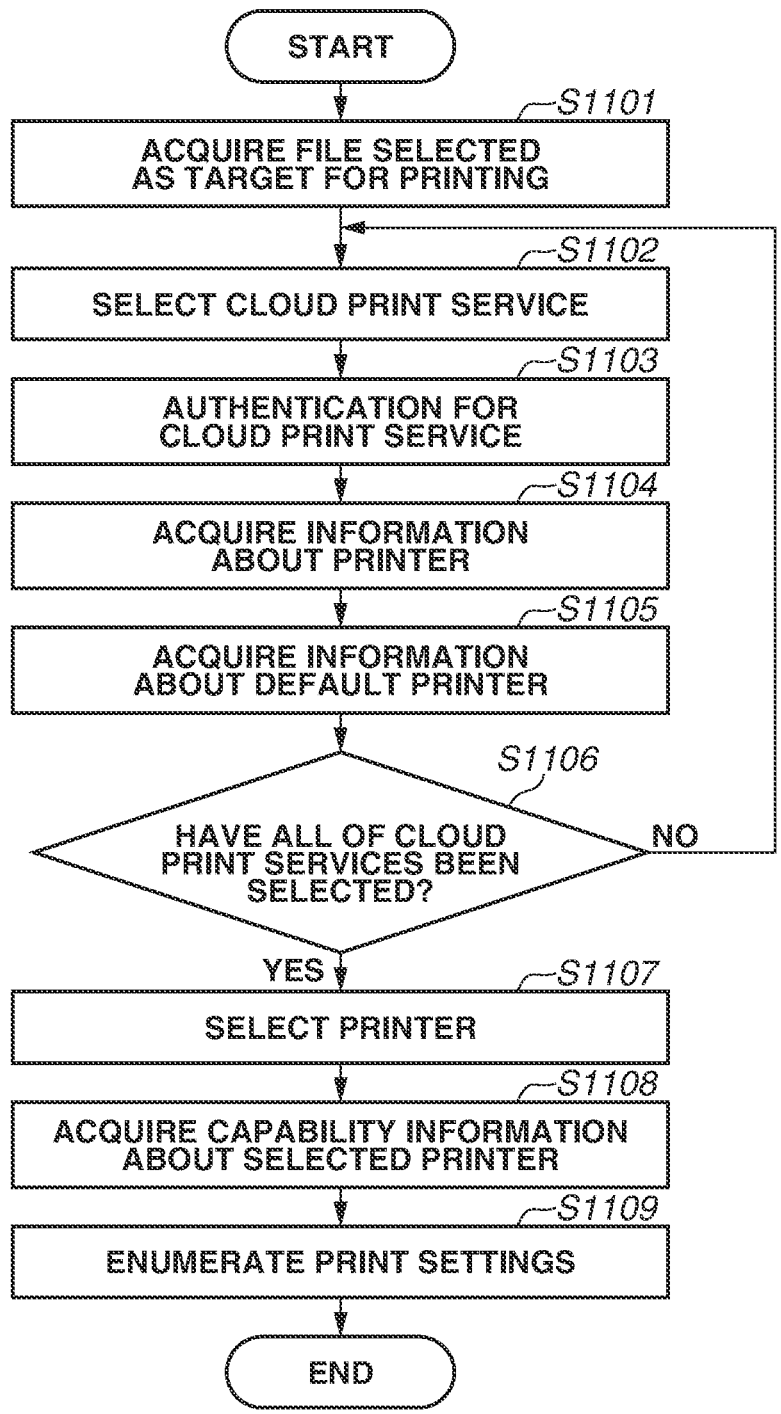
FIG. 11 is a flowchart illustrating display control of the print setting screen.

Next, an example of processing for performing display control of a print setting screen 701 illustrated in FIG. 7 is described with reference to the flowchart of FIG. 11.

First, in step S1101, when the print setting call button 503 in the business chat service screen 500 illustrated in FIG. 5 is pressed by the user, the web server 302 acquires a file selected as a target for printing in the area 502. In the example illustrated in FIG. 5, the web server 302 acquires a file the checkbox for which is checked and the file name of which is "Sample.pptx". For example, the web server 302 performs acquisition of a file name and acquisition of information about an access location of real data in such a way as to enable identifying which data the file is at the time of future print processing. Furthermore, in preparation for a case where, for example, there are files with the same file name, the web server 302 can acquire data also including a folder name or an file ID. Furthermore, the number of files to be selected as targets for printing can be one or can be two or more. In the example illustrated in the first exemplary embodiment, the user is able to select a plurality of files as files targeted for printing only by checking checkboxes. In a case where the number of files to be selected as targets for printing is two or more, processing operations in step S1102 and subsequent steps can be individually performed on each of the two or more files, or processing operations in step S1102 and subsequent steps can be collectively performed on the two or more files.

Next, in step S1102, the web server 302 selects one cloud print service 305 which is enabled with respect to the cloud print services 305. The user is assumed to preliminarily select a cloud print service which cooperates with the printing application and perform acquisition of information required for authentication processing for the selected cloud print service. In step S1102, the web server 302 selects one cloud print service preliminarily selected.

Next, the authentication service 304 performs authentication processing for the cloud print service 305 selected in step S1102, based on a request from the web server 302. Then, in step S1103, the web server 302 receives a result of the authentication processing for the cloud print service 305 from the authentication service 304. In step S1103, the web server 302 transmits preliminarily acquired information required for authentication and an authentication request to the cloud print service 305 selected in step S1102. Furthermore, in a case where information required for authentication for the cloud print service is not currently stored in the web server 302, the web server 302 can cause the computer to display a screen for inputting information required for authentication and receive the input information from the computer.

In a case where the authentication service 304 which the cloud print service 305 targets is in common with another service and authentication for the cloud print service 305 is already finished, the present step can be omitted. Moreover, in a case where, in a system such as a browser, an application, or an operating system (OS), the expiration date of authentication for the cloud print service 305 has not yet passed and information about the cloud print service 305 is able to be referred to, the present step also can be omitted.

When authentication for the cloud print service 305 has ended, in step S1104, the web server 302 acquires information about the printer 200 which is being managed by the cloud print service 305. For example, at least one of pieces of information about a printer which is allocated to a user who has pressed the print setting call button 503, a printer which is allocated to a group to which the user belongs, and a printer the use authority of which is included in, for example, the web server 302 is acquired. The printer information acquired in step S1104 is used as information about a printer which is able to be used for performing printing via the printing application.

Next, in step S1105, in a case where there is a definition of a default printer for each cloud print service 305, the web server 302 acquires and retains information about a default printer in the cloud print service 305 selected in step S1102. FIG. 12 is a diagram illustrating an example of information about a default printer for each cloud print service 305. Furthermore, the information about default printers illustrated in FIG. 12 is stored in, for example, a location corresponding to an environment in which the processing illustrated in the flowchart of FIG. 11 is being performed. In the first exemplary embodiment, a case where the processing illustrated in the flowchart of FIG. 11 is performed by the web server 302 is illustrated as an example. Accordingly, the information about default printers illustrated in FIG. 12 is stored in the storage unit 3024 of the web server 302. Moreover, for example, in a case where the processing illustrated in the flowchart of FIG. 11 is performed by the computer 100, the information about default printers illustrated in FIG. 12 is stored in, for example, the main storage device 102, to which the application 1051 or the OS 1054 is able to refer. Moreover, the information about default printers illustrated in FIG. 12 can include, in addition to an initial value of each cloud print service 305, information concerning default setting performed in, for example, the local computer 100.

Next, in step S1106, the web server 302 determines whether the web server 302 has selected all of the cloud print services 305 which are enabled with respect to the cloud print services 305.

If it is determined that the web server 302 has not yet selected all of the cloud print services 305 which are enabled with respect to the cloud print services 305 (NO in step S1106), the web server 302 returns the processing to step S1102. Processing operations in step S1102 to step S1106 are repetitively performed until, in step S1106, it is determined that the web server 302 has selected all of the cloud print services 305 which are enabled with respect to the cloud print services 305. Furthermore, in a case where the numbers of cloud print services 305 which are enabled with respect to the cloud print services 305 is one, the repetitive processing operations in step S1102 to step S1106 are not performed.

Then, if, in step S1106, it is determined that the web server 302 has selected all of the cloud print services 305 which are enabled with respect to the cloud print services 305 (YES in step S1106), the web server 302 advances the processing to step S1107. In step S1107, the web server 302 selects a printer 200 to be set in the print setting screen 701, with use of, for example, the information about default printers illustrated in FIG. 12. For example, in a case where the number of cloud print services 305 which cooperate with the printing application is one, the web server 302 displays, in the area 702 illustrated in FIG. 7, a default printer stored while being associated with the cloud print service 305 concerned as a default value. In a case where there are two or more cloud print services 305 which cooperate with the printing application, a default printer corresponding to any one of the cloud print services 305 is displayed as a default value in the area 702 illustrated in FIG. 7. In a case where a default printer is not set for any cloud print service 305, a printer written at the head of printer information acquired from any cloud print service 305 is displayed as a default value in the area 702 illustrated in FIG. 7.

Furthermore, a configuration in which a default value in the area 702 illustrated in FIG. 7 is not designated as a specific printer but is designated by the user can be employed. For example, processing can be performed in such a manner that a list of the acquired pieces of printer information is displayed in response to the selection button 703 being pressed and a printer selected by the user from the list is supposed to be a printer selected in step S1107.

Next, in step S1108, the web server 302 acquires capability information about the printer 200 selected in step S1107, and, in step S1109, the web server 302 enumerates print settings 704 for the printer 200 based on the capability information about the printer 200. At this time, for example, the web server 302 can perform masking of a print setting which is unavailable in the printer 200, add a print setting which is executable in the printer 200, or change the initial value of a print setting to a customized default value. Addition of a print setting can be performed by an additional setting button 705 being pressed.

Furthermore, after displaying of the print setting screen 701, when the user selects the selection button 703, a list of pieces of printer information is displayed, and, each time a printer selected by the user from the list is changed, processing operations in step S1107 to step S1109 are performed.

With the above-described processing performed, it becomes possible to control displaying of the print setting screen 701.

In the print setting screen 701, a case where printing is started in response to a print button 706 being pressed is illustrated as an example. Moreover, a cancel button 707 is pressed to cancel the print settings.

FIGS. 13A and 13B are sequence diagrams illustrating an example of the entire processing which is performed in the information processing system in the first exemplary embodiment. In the present sequence diagram, a case where, for example, generation of a list of files which the user manages, communication with the cloud print service 305, and print processing are performed mainly by the web server 302 is illustrated as an example.

First, in step S1301, when the printing application button 402 in the business chat service screen 400 is pressed, processing for causing the business chat service screen 400 to transition to the business chat service screen 500 is started.

Next, in step S1302, the computer 100 makes a request for a web page to the web server 302. The processing operation in step S1302 is performed based on, for example, a table illustrated in FIG. 6C. The computer 100 acquires reference information about an application to be started up from a chat service, and transmits a request for a web page to the acquired reference information.

After that, in step S1303 to step S1305, to acquire user information and the location of a file to be referred to (the cloud storage 303 to be accessed), the web server 302 performs authentication processing with respect to the business chat service 301. Processing operations in step S1301 to step S1305 are request processing for access to the business chat service 301. Furthermore, in a case where the web server 302 has already acquired information for acquiring necessary information from the business chat service 301, processing operations in step S1303 to step S1305 are omitted.

First, in step S1303, the web server 302 makes an access request for obtaining permission of access to the cloud storage 303 to the business chat service 301.

At this time, the web server 302 performs processing for causing an authentication screen 901 illustrated in FIG. 9 to be displayed on the monitor 1041 of the computer 100, and prompts the user to input a user ID and a password to the authentication screen 901. The web server 302 transmits the user ID and password input to the authentication screen 901 to the business chat service 301. Then, the business chat service 301 transmits the user ID and password transmitted from the web server 302 to the authentication service 304, and requests the authentication service 304 to perform authentication for the business chat service 301.

Then, in step S1304, the authentication service 304 performs authentication for the business chat service 301. Furthermore, authentication in the authentication service 304 can be performed in the business chat service 301. If authentication is successful and permission of access has been obtained, then in step S1305, the web server 302 acquires authentication information for accessing the business chat service 301.

Next, in step S1306 and step S1307, the web server 302 requests user information required for acquiring a file from the business chat service 301 and acquires the user information from the business chat service 301. For example, the web server 302 acquires a user name or user ID or a group name or group ID.

Moreover, the web server 302 acquires information about the location of a personal directory of the user or information about the cloud storage 303 linking to the business chat service 301. After acquiring user information required for acquiring files, then in step S1308 and step S1309, the web server 302 requests information about files from the cloud storage 303 based on the user information and acquires the information about files from the cloud storage 303. Then, in step S1310, the web server 302 creates a web page to be displayed in the area 502 of the business chat service screen 500 based on the information about files acquired in step S1309, and transmits the web page to the computer 100.

After that, when the print setting call button 503 in the business chat service screen 500 is pressed, then in step S1311, the computer 100 requests the web server 302 to perform calling of the print setting screen 701. Next, in step S1312, the web server 302 makes, to the cloud print service 305, an access request for obtaining permission of access (acquisition of information about the printer 200) to the cloud print service 305. For example, as with step S1303, the web server 302 performs processing for causing an authentication screen 901 illustrated in FIG. 9 to be displayed on the monitor 1041 of the computer 100, and prompts the user to input a user ID and a password to the authentication screen 901. The web server 302 transmits the user ID and password input to the authentication screen 901 to the cloud print service 305. Then, the cloud print service 305 transmits the user ID and password transmitted from the web server 302 to the authentication service 304, and requests the authentication service 304 to perform authentication for the cloud print service 305. Then, in step S1313, the authentication service 304 performs authentication for the cloud print service 305. Furthermore, authentication in the authentication service 304 can be performed in the cloud print service 305. If authentication is successful and permission of access has been obtained, then in step S1314, the web server 302 acquires authentication information. Furthermore, in a case where the web server 302 has already acquired information for acquiring necessary information from the cloud print service 305, processing operations in step S1312 to step S1314 are omitted.

Next, in step S1315 and step S1316, the web server 302 requests information about the printer 200 or information about a default printer from the cloud print service 305 and acquires the printer information from the cloud print service 305. Then, the web server 302 performs processing for causing the print setting screen 701 to be displayed on the monitor 1041 of the computer 100.

After that, when the print button 706 in the print setting screen 701 is pressed, then in step S1317, the computer 100 makes a printing request to the web server 302. Here, in a case where it is necessary to, instead of communicating a link or reference destination for a file, upload the entity of a file to the cloud print service 305 serving as a request destination for print processing, processing operations in step S1318 and step S1319 are performed. Thus, in step S1318 and step S1319, the web server 302 requests the cloud storage 303 in which a file targeted for printing exists to acquire the entity of the file and downloads the entity of the file. Furthermore, in a case where the web server 302 has already acquired information required for acquiring information about a file, processing operations in step S1318 and step S1319 are omitted.

After the completion of preparations for the downloaded file, then in step S1320, the web server 302 transmits the file concerned to the cloud print service 305 together with print settings designated in the print setting screen 701, and requests the cloud print service 305 to perform print processing. In step S1321 and step S1322, the cloud print service 305, having received the printing request, instructs the printer 200 to execute print processing, and acquires a result of the print processing.

In step S1323 and step S1324, the cloud print service 305, having received the result of the print processing, transmits the result of the print processing to the computer 100 via the web server 302, and instructs the computer 100 to display the result of the print processing. The result of the print processing is displayed on the monitor 1041 of the computer 100.

The above-described processing enables executing printing via the printing application incorporated in the business chat service 301.

As described above, in the first exemplary embodiment, when the user who is participating in chat with use of the business chat service 301 presses the printing application button 402 to start up the printing application, the business chat service screen 500 is displayed. When the "Print" tab in the business chat service screen 500 is selected, a list of files serving as candidates for printing is displayed in the area 502. The files displayed in the list include one file identified based on the access time of the user. Moreover, in the list, checkboxes for selecting files are displayed. When the user checks a checkbox and presses the print setting call button 503, the print setting screen 701 is displayed. Then, when the user presses the print button 706, a file corresponding to the checked checkbox is printed. Accordingly, it is possible to reduce the user's trouble of selecting a file targeted for printing, in a case where a plurality of users shares files with use of the business chat service 301.

Moreover, in the first exemplary embodiment, a list of files serving as candidates for printing is displayed in the area 502 in a state in which a checkbox for a file satisfying a default check condition has been checked. Accordingly, it is possible to more reduce the user's trouble of selecting a file targeted for printing.

Moreover, in the first exemplary embodiment, in a case where there is a file satisfying a default check condition relatively high in priority, a list of files serving as candidates for printing is displayed in the area 502 in a state in which a checkbox for the file concerned has been checked. Accordingly, for example, it is possible to preferentially select a file highly likely to be selected by the user as a file targeted for printing and bring about a state in which a checkbox for the file concerned has been checked. Moreover, in a case where there is no file satisfying a default check condition relatively high in priority, a list of files serving as candidates for printing is displayed in the area 502 in a state in which a checkbox for a file satisfying a default check condition relatively low in priority has been checked. Accordingly, for example, it is possible to reduce (or make zero) the probability that a checkbox which is in a state of being checked at a stage where a list of files serving as candidates for printing has been displayed does not exist.

Next, a second exemplary embodiment is described. In the first exemplary embodiment, a case where retention of a list of files serving as candidates for printing, retention of print data, and print processing are performed by the web server 302 has been illustrated as an example. In this case, a load may be put on the web server 302. Therefore, in the second exemplary embodiment, a case where acquisition of a list of files and print processing are performed on a web page read into the computer 100 is described. This enables reducing a load which is put on the web server 302. In this way, the second exemplary embodiment differs from the first exemplary embodiment mainly in that a part of processing which the web server 302 performs is performed by the computer 100. Accordingly, in the description of the second exemplary embodiment, portions identical to those in the first exemplary embodiment are, for example, assigned the respective same reference characters as those assigned in FIG. 1 to FIGS. 13A and 13B and are omitted from detailed description.

FIGS. 13A and 13B are sequence diagrams illustrating an example of the entire processing which is performed in an information processing system in the second exemplary embodiment.

First, in step S1301, when the printing application button 402 in the business chat service screen 400 is pressed, processing for causing the business chat service screen 400 to transition to the screen 500 illustrated in FIG. 5 is started. Next, in step S1302, the computer 100 makes a request for a page for printing to the web server 302.

Then, in step S1401, the web server 302 transmits a page for printing to the computer 100. In the case of the first exemplary embodiment, in step S1310, a web page to be displayed in the area 502 in the business chat service screen 500 is transmitted to the computer 100. On the other hand, in the case of the second exemplary embodiment, not a web page in which files which the user accessed are enumerated but a page in which a table for the list is in a vacant state at the acquisition stage and into which, for example, JavaScript via which the user acquires files has been incorporated is transmitted to the computer 100.

Subsequent processing operations in step S1402 to step S1407 differ from the processing operations in step S1303 and step S1305 to step S1309 only in that an execution location and a storage location of data are not the web server 302 but the computer 100, and, therefore, the detailed description of the processing operations in step S1402 to step S1407 is omitted. Furthermore, in step S1304, the processing operation in step S1304 described above in the first exemplary embodiment is performed.

After acquiring information about files from the cloud storage 303 in step S1407, then in step S1408, the computer 100 updates the page acquired in step S1401 to draw a table in which the files are listed. Furthermore, in the second exemplary embodiment, since a page for printing is transmitted to the computer 100 in step S1401, a processing operation in step S1310 described above in the first exemplary embodiment is not performed.

Subsequent processing operations in step S1409 to step S1412 (processing for acquiring information about the printer 200 from the cloud print service 305) also differ from the processing operations in step S1312 and step S1314 to step S1316 only in that an execution location is changed from the web server 302 to the computer 100. Accordingly, the detailed description of such processing operations is omitted. Furthermore, in step S1313, a processing operation in step S1313 described above in the first exemplary embodiment is performed.

In a case where the print button 706 in the print setting screen 701 has been pressed, in the first exemplary embodiment, since printing is performed via the web server 302, the post destination (transmission destination) of processing for a print request is the web server 302 (step S1317). On the other hand, in the second exemplary embodiment, a print request is transmitted from the computer 100 directly to the cloud print service 305. Therefore, the post destination (transmission destination) of processing for a print request is the cloud print service 305 (step S1416). The other processing operations in step S1414, step S1415, and step S1417 differ from the processing operations in step S1318, step S1319, and step S1323 only in that an execution location and a storage location of data are changed from the web server 302 to the computer 100, and, therefore, the detailed description of such processing operations is omitted. Furthermore, in step S1321 and step S1322, the processing operations in step S1321 and step S1322 described above in the first exemplary embodiment are performed.

Furthermore, processing operations in step S1402 to step S1403, step S1409, step S1410, step S1414, and step S1415 can be omitted in a case where the computer 100 has already acquired information required for acquiring pieces of information from the respective services.

Performing the above-described processing enables issuing an instruction for printing via a web page in the local computer 100. Accordingly, in addition to the advantageous effects described above in the first exemplary embodiment, such an advantageous effect that it is possible to reduce a load on the web server 302 can be obtained.

The present disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the present disclosure can also be implemented by a circuit which implements one or more functions of the above-described exemplary embodiments (for example, an application specific integrated circuit (ASIC)).

Each of the above-described exemplary embodiments merely illustrates a specific example for implementing the present disclosure, and these exemplary embodiments should not be construed to limit the technical scope of the present disclosure. Thus, the present disclosure can be embodied in various forms without departing from the technical scope thereof or the principal features thereof.

According to an aspect of the present disclosure, it is possible to reduce the user's trouble of selecting a file targeted for printing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-193467 filed Dec. 2, 2022, which is hereby incorporated by reference herein in its entirety.

What is claimed is:

1. An information processing system comprising:
one or more memories storing instructions; and one or more processors that, upon execution of the stored instructions, are configured to operate as:
a providing unit configured to provide a chat service that allows a user to communicate with other users via a displayed chat screen;
a management unit configured to manage files uploaded via the chat screen of the chat service, the files being accessible to the user of the chat service;
a display unit configured to display, on a screen, the chat screen and a select screen including a list of files including a file that is-uploaded via the chat screen of the chat service, wherein a location of the uploaded file is indicated on the list, wherein the select screen is displayed in a state where the chat screen is not displayed; and
an output unit configured to output, in accordance with a print instruction received on the select screen from the user, information for printing a file selected on the select screen by the user from the list of files.

2. The information processing system according to claim 1, wherein the list of files includes files which are extracted in order of an access time being newer from among the files managed by the management unit.

3. The information processing system according to claim 1, wherein the list of files includes a file satisfying a predetermined extraction condition.

4. The information processing system according to claim 1,
wherein the list of files includes information indicating whether the file has been selected, and
wherein the display unit displays by default, as information indicating whether the file has been selected with respect to a file satisfying a predetermined default display condition out of the files included in the list of files, information indicating that the file is currently selected.

5. The information processing system according to claim 4, wherein the file satisfying the default display condition includes at least one of the file whose an access time is newest and the file opened at a time closest to when the list of files is displayed.

6. The information processing system according to claim 1, wherein the display unit displays the list of files after a user operation for performing printing is received.

7. The information processing system according to claim 6, wherein the user operation includes an operation for starting up a printing application to be added to a tool for performing the communication.

8. The information processing system according to claim 1, further comprising a printing unit configured to perform printing of the file.

9. The information processing system according to claim 8, wherein the output unit outputs the information for printing the file selected on the select screen by the user from the list of files to the printing unit.

10. The information processing system according to claim 1, wherein the display unit displays, on the screen, a setting screen for a print setting of the file selected on the select screen.

11. An information processing method comprising:
providing a chat service that allows a user to communicate with other users via a displayed chat screen;
managing files uploaded via the chat screen of the chat service, the files being accessible to the user of the chat service;
displaying, on a screen, the chat screen and a select screen including a list of files including a file that is uploaded via the chat screen of the chat service, wherein a location of the uploaded file is indicated on the list and where the select screen is displayed in a state where the chat screen is not displayed; and
outputting, in accordance with a print instruction received on the select screen from the user, information for printing a file selected on the select screen by the user from the list of files.

12. A non-transitory computer-readable storage medium storing computer-executable instructions that, when executed by a computer, cause the computer to perform a control method comprising:
providing a chat service that allows a user to communicate with other users via a displayed chat screen;
managing files uploaded via the chat screen of the chat service, the files being accessible to the user of the chat service;
displaying, on a screen, the chat screen and a select screen including a list of files including a file that is uploaded via the chat screen of the chat service, wherein a location of the uploaded file is indicated on the list and where the select screen is displayed in a state where the chat screen is not displayed; and
outputting, in accordance with a print instruction received on the select screen from the user, information for printing a file selected on the select screen by the user from the list of files.

* * * * *